United States Patent
Bergström et al.

(10) Patent No.: US 12,463,758 B2
(45) Date of Patent: Nov. 4, 2025

(54) DIRECT CURRENT (DC) LOCATION REPORTING FOR INTRA-BAND UPLINK CARRIER AGGREGATION (CA)

(71) Applicant: Telefonaktiebolaget LM Ericsson (publ), Stockholm (SE)

(72) Inventors: Mattias Bergström, Sollentuna (SE); Zhenhua Zou, Solna (SE); Christian Bergljung, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 344 days.

(21) Appl. No.: 18/031,297

(22) PCT Filed: Oct. 20, 2021

(86) PCT No.: PCT/SE2021/051038
§ 371 (c)(1),
(2) Date: Apr. 11, 2023

(87) PCT Pub. No.: WO2022/086409
PCT Pub. Date: Apr. 28, 2022

(65) Prior Publication Data
US 2023/0388066 A1 Nov. 30, 2023

Related U.S. Application Data

(60) Provisional application No. 63/094,944, filed on Oct. 22, 2020.

(51) Int. Cl.
*H04L 5/00* (2006.01)
(52) U.S. Cl.
CPC .......... *H04L 5/001* (2013.01); *H04L 5/0092* (2013.01); *H04L 5/0098* (2013.01)

(58) Field of Classification Search
CPC ...... H04L 5/001; H04L 5/0092; H04L 5/0098
See application file for complete search history.

(56) References Cited

U.S. PATENT DOCUMENTS

| | | | |
|---|---|---|---|
| 2019/0313394 A1* | 10/2019 | Kubota | ............... H04L 5/001 |
| 2022/0110124 A1* | 4/2022 | Wang | ............... H04W 72/0453 |
| 2023/0396400 A1* | 12/2023 | Bhamri | ............... H04L 5/0044 |

OTHER PUBLICATIONS

"3GPP 23.501 V16.6.0", 3rd Generation Partnership Project; Technical Specification Group Services and System Aspects; System architecture for the 5G System (5GS); Stage 2 (Release 16), Sep. 2020, pp. 1-447.

(Continued)

*Primary Examiner* — Harry H Kim
(74) *Attorney, Agent, or Firm* — Murphy, Bilak & Homiller, PLLC

(57) ABSTRACT

Embodiments include methods for a user equipment (UE) to transmit uplink (UL) data in a wireless network based on carrier aggregation (CA). Such methods include determining active UL bandwidth parts (BWPs) associated with at least two component carriers (CCs) within a frequency band; and determining at least one UL transmit direct current (TX DC) location for the active UL BWPs. Such methods also include selectively sending an indication of the at least one UL TX DC location to the wireless network. In some cases, such methods include transmitting, to the wireless network via the active UL BWPs, data arranged in at least one OFDM symbol having the respective at least one UL TX DC location. Other embodiments include complementary methods for a wireless network (e.g., one or more network nodes), as well as UEs and wireless networks configured to perform such methods.

16 Claims, 7 Drawing Sheets

```
UplinkTxDirectCurrentUL-CA ::= SEQUENCE {
    absoluteFrequencyPointA          ARFCN-ValueNR
    shift7dot5kHz                    BOOLEAN,
    txDirectCurrentLocation          INTEGER (0..3299)
    subcarrierSpacing                SubcarrierSpacing,
}
```

(56) References Cited

OTHER PUBLICATIONS

"On DC location reporting for intra-band UL CA", 3GPP TSG-RAN meeting #89-e, RP-201746, Electronic meeting, Sep. 14-18, 2020, pp. 1-5.
"On intra-band CA DC location", 3GPP TSG-RAN4 WG4 Meeting # 96-e, R4-2011472, Electronic meeting, Aug. 17-28, 2020, pp. 1-6.
"3GPP TS 38.211 V16.2.0", 3rd Generation Partnership Project; Technical Specification Group Radio Access Network; NR; Physical channels and modulation (Release 16), Jun. 2020, pp. 1-131.
"3GPP TS 38.331 V16.2.0", 3rd Generation Partnership Project; Technical Specification Group Radio Access Network; NR; Radio Resource Control (RRC) protocol specification (Release 16), Sep. 2020, pp. 1-921.

* cited by examiner

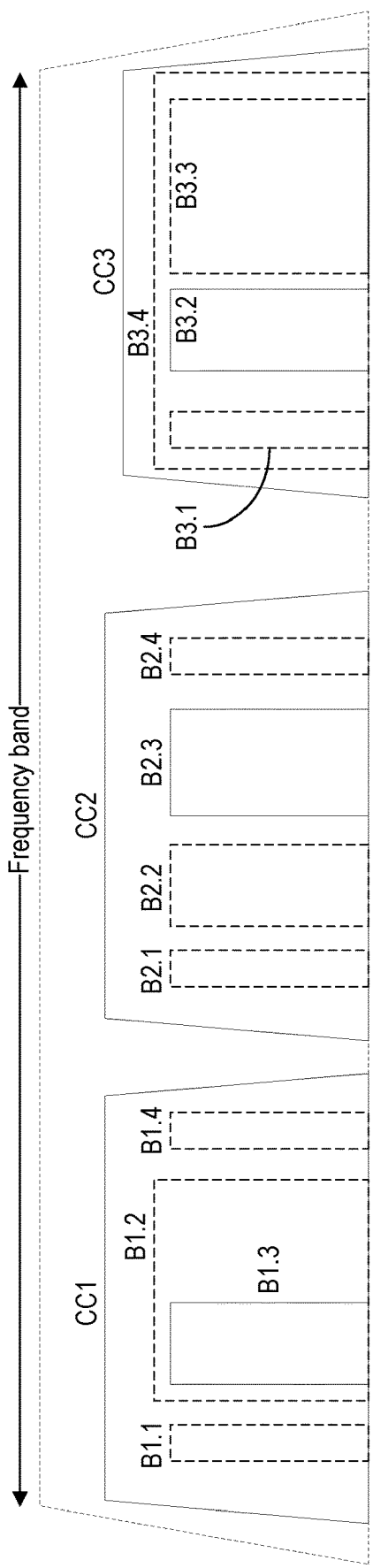

FIG. 4

```
-- ASN1START
-- TAG-UPLINKTXDIRECTCURRENTLIST-START

UplinkTxDirectCurrentList ::=   SEQUENCE (SIZE (1..maxNrofServingCells)) OF UplinkTxDirectCurrentCell UplinkTxDirectCurrentCell ::=   SEQUENCE {
    servCellIndex              ServCellIndex,
    uplinkDirectCurrentBWP     SEQUENCE (SIZE (1..maxNrofBWPs)) OF UplinkTxDirectCurrentBWP,
    ...,
    [[
    uplinkDirectCurrentBWP-SUL  SEQUENCE (SIZE (1..maxNrofBWPs)) OF UplinkTxDirectCurrentBWP   OPTIONAL
    ]]
}
UplinkTxDirectCurrentBWP ::=    SEQUENCE {
    bwp-Id                     BWP-Id,
    shift7dot5kHz              BOOLEAN,
    txDirectCurrentLocation    INTEGER (0..3301)
}

-- TAG-UPLINKTXDIRECTCURRENTLIST-STOP
-- ASN1STOP
```

FIG. 5

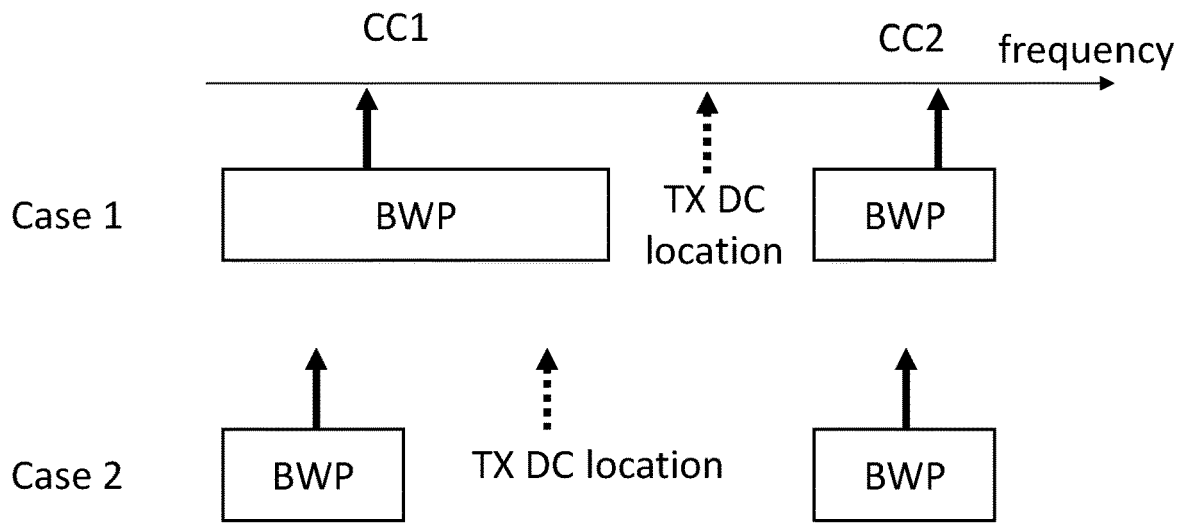

FIG. 6

```
UplinkTxDirectCurrentUL-CA ::  = SEQUENCE {
    absoluteFrequencyPointA         ARFCN-ValueNR
    shift7dot5kHz                   BOOLEAN,
    txDirectCurrentLocation         INTEGER (0..3299)
    subcarrierSpacing               SubcarrierSpacing,
}
```

FIG. 7

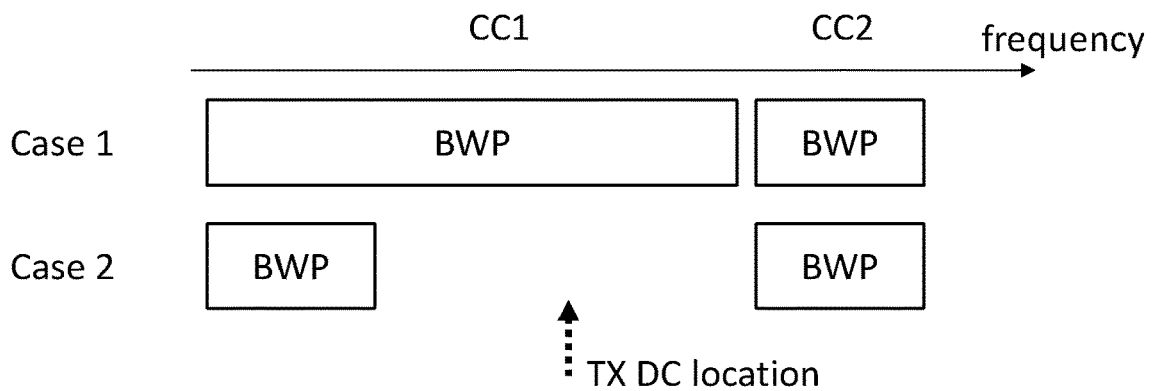

FIG. 8

```
UplinkTxDirectCurrentUL-CA ::  = SEQUENCE {
    absoluteFrequencyPointA-low     ARFCN-ValueNR
    absoluteFrequencyPointA-high    ARFCN-ValueNR
    shift7dot5kHz                   BOOLEAN,
    txDirectCurrentLocation         INTEGER (0..3299)
    subcarrierSpacing               SubcarrierSpacing,
}
```

FIG. 9

DIRECT CURRENT (DC) LOCATION REPORTING FOR INTRA-BAND UPLINK CARRIER AGGREGATION (CA)

TECHNICAL FIELD

The present disclosure relates generally to wireless communication networks, and more specifically to techniques for improving uplink (UL, e.g., device to network) data rates based on aggregations of multiple cells or component carriers (CCs).

BACKGROUND

Currently the fifth generation ("5G") of cellular systems, also referred to as New Radio (NR), is being standardized within the Third-Generation Partnership Project (3GPP). NR is developed for maximum flexibility to support multiple and substantially different use cases. These include enhanced mobile broadband (eMBB), machine type communications (MTC), ultra-reliable low latency communications (URLLC), side-link device-to-device (D2D), and several other use cases.

FIG. 1 illustrates an exemplary high-level view of the 5G network architecture, consisting of a Next Generation RAN (NG-RAN) 199 and a 5G Core (5GC) 198. NG-RAN 199 can include a set of gNodeB's (gNBs) connected to the 5GC via one or more NG interfaces, such as gNBs 100, 150 connected via interfaces 102, 152, respectively. In addition, the gNBs can be connected to each other via one or more Xn interfaces, such as Xn interface 140 between gNBs 100 and 150. With respect the NR interface to UEs, each of the gNBs can support frequency division duplexing (FDD), time division duplexing (TDD), or a combination thereof.

NG-RAN 199 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB is connected to all 5GC nodes within an "AMF Region," which is defined in 3GPP TS 23.501. If security protection for CP and UP data on TNL of NG-RAN interfaces is supported, NDS/IP shall be applied.

The NG RAN logical nodes shown in FIG. 1 include a central (or centralized) unit (CU or gNB-CU) and one or more distributed (or decentralized) units (DU or gNB-DU). For example, gNB 100 includes gNB-CU 110 and gNB-DUs 120 and 130. CUs (e.g., gNB-CU 110) are logical nodes that host higher-layer protocols and perform various gNB functions such controlling the operation of DUs. Each DU is a logical node that hosts lower-layer protocols and can include, depending on the functional split, various subsets of the gNB functions. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

A gNB-CU connects to gNB-DUs over respective F1 logical interfaces, such as interfaces 122 and 132 shown in FIG. 1. The gNB-CU and connected gNB-DUs are only visible to other gNBs and the 5GC as a gNB. In other words, the F1 interface is not visible beyond gNB-CU.

FIG. 2 shows a high-level view of an exemplary 5G network architecture, including a Next Generation Radio Access Network (NG-RAN) 299 and a 5G Core (5GC) 298. As shown in the figure, NG-RAN 299 can include gNBs 210 (e.g., 210a,b) and ng-eNBs 220 (e.g., 220a,b) that are interconnected with each other via respective Xn interfaces. The gNBs and ng-eNBs are also connected via the NG interfaces to 5GC 298, more specifically to the AMF (Access and Mobility Management Function) 230 (e.g., AMFs 230a, b) via respective NG-C interfaces and to the UPF (User Plane Function) 240 (e.g., UPFs 240a,b) via respective NG-U interfaces. Moreover, the AMFs 230a,b can communicate with one or more policy control functions (PCFs, e.g., PCFs 250a,b) and network exposure functions (NEFs, e.g., NEFs 260a,b).

Each of the gNBs 210 can support the NR radio interface including frequency division duplexing (FDD), time division duplexing (TDD), or a combination thereof. Each of ng-eNBs 220 can support the fourth-generation (4G) Long-Term Evolution (LTE) radio interface. Unlike conventional LTE eNBs, however, ng-eNBs 220 connect to the 5GC via the NG interface. Each of the gNBs and ng-eNBs can serve a geographic coverage area including one more cells, such as cells 211a-b and 221a-b shown in FIG. 2. Depending on the particular cell in which it is located, a UE 205 can communicate with the gNB or ng-eNB serving that particular cell via the NR or LTE radio interface, respectively. Although FIG. 2 shows gNBs and ng-eNBs separately, it is also possible that a single NG-RAN node provides both types of functionality.

5G/NR technology shares many similarities with 4G/LTE. For example, NR uses CP-OFDM (Cyclic Prefix Orthogonal Frequency Division Multiplexing) in the DL and both CP-OFDM and DFT-spread OFDM (DFT-S-OFDM) in the UL. As another example, in the time domain, NR DL and UL physical resources are organized into equal-sized 1-ms subframes. A subframe is further divided into multiple slots of equal duration, with each slot including multiple OFDM-based symbols. However, time-frequency resources can be configured much more flexibly for an NR cell than for an LTE cell. For example, rather than a fixed 15-kHz OFDM sub-carrier spacing (SCS) as in LTE, NR SCS can range from 15 to 240 kHz, with even greater SCS considered for future NR releases.

The radio resource control (RRC) layer in the NR protocol stack controls communications between UE and gNB at the radio interface as well as the mobility of a UE between cells in the NG-RAN. RRC also broadcasts system information (SI) and performs establishment, configuration, maintenance, and release of DRBs and Signaling Radio Bearers (SRBs) and used by UEs. Additionally, RRC controls addition, modification, and release of carrier aggregation (CA) and dual-connectivity (DC) configurations for UEs. RRC also performs various security functions such as key management.

After a UE is powered ON it will be in the RRC_IDLE state until an RRC connection is established with the network, at which time the UE will transition to RRC_CONNECTED state where data transfer can occur). The UE returns to RRC_IDLE after the connection with the network is released. In RRC_IDLE state, the UE's radio is active on a discontinuous reception (DRX) schedule configured by upper layers. During DRX active periods (also referred to as "DRX On durations"), an RRC_IDLE UE, receives SI broadcast in the cell where the UE is camping, performs measurements of neighbor cells to support cell reselection, and monitors a paging channel on PDCCH for pages from 5GC via gNB. An NR UE in RRC_IDLE state is not known to the gNB serving the cell where the UE is camping. However, NR RRC includes an RRC_INACTIVE state in which a UE is known (e.g., via UE context) by the serving gNB. RRC_INACTIVE has some properties similar to a "suspended" condition used in LTE.

As mentioned above, time-frequency resources can be configured much more flexibly for an NR cell than for an LTE cell. One aspect of this flexibility is the use of bandwidth parts (BWPs). While most gNBs can utilize wider bandwidths available in 5G, UE capabilities may vary. Each NR BWP has its own SCS (also referred to as "numerology") and signal characteristic, enabling more efficient use of the spectrum and more efficient UE energy consumption. An NR UE can be configured with up to four BWPs in the DL for any single carrier, with one DL BWP being active at a given time. A UE can be configured with up to four BWPs in the UL for a single carrier, with one UL BWP being active at a given time.

In OFDM, the carrier frequency is also referred to as the direct current (DC) sub-carrier. In LTE, the DC subcarrier was not used for any data transmission on the DL (i.e., reserved) and a 7.5-kHz frequency shift was introduced on the UL to avoid having DC completely aligned with a single subcarrier. This is primarily because the DC subcarrier may have high interference due to local oscillator (LO) leakage in the base station and/or the UE.

In NR, however, a UE may see only part of a carrier (i.e., BWP), which may not be centered on the carrier frequency. In other words, each NR UE may have its DC subcarrier at different locations in the carrier bandwidth based on the active BWP, whereas LTE UEs typically have DC subcarrier at the center of the carrier bandwidth. Thus, NR does not reserve the DC subcarrier, accepting that the quality of this subcarrier may deteriorate in some situations. Instead, the transmitter informs the receiver whether the transmit DC subcarrier is present in a particular BWP and, if so, its subcarrier location (also referred to as "TX DC location").

NR also supports the feature of carrier aggregation (CA), which was introduced in LTE Rel-10. In CA, the network can configure a "wideband" carrier for the UE based on a number of "component carriers". In the context of CA, the terms "component carrier" (or CC, for short) and "cell" are often used interchangeably. A primary serving cell (PCell) is defined as the "main" cell serving the wireless device such that both data and control signaling can be transmitted over the PCell, while one or more supplementary or secondary serving cells (SCells) are typically used for transmitting data only. For example, the SCell(s) provide(s) extra bandwidth to enable greater data throughput. A CA-capable UE can be assigned a PCell (or CC) that is always activated, and one or more SCells (or CCs) that can be activated or deactivated dynamically.

The number of aggregated CCs and bandwidth of individual CCs can differ for UL and DL. A "symmetric configuration" refers to when the number of CCs in UL and DL is the same, whereas an "asymmetric configuration" refers to when the number of CCs is different. Furthermore, the number of CCs configured within a wideband carrier may be different from the number of CCs seen by a UE. For example, a UE can support more DL CCs than UL CCs, even though the wideband carrier is configured with the same number of UL CCs and DL CCs.

Additionally, CA can be configured as interband, intraband contiguous, or intraband non-contiguous. Intraband means that the aggregated CCs reside in the same frequency band, and are either contiguous (e.g., adjacent) or non-contiguous (e.g., separated). In contrast, interband CCs are located in different frequency bands.

NR also supports the combined use of CA and BWPs. For example, a UE can be configured with multiple CCs and up to four DL and four UL BWPs on each CC. On each CC, the UE can have one configured DL BWP and one configured UL BWP active at any given time.

SUMMARY

The use of BWPs can result in various problems, difficulties, and/or issues with intraband CA, particularly in relation to determining and/or reporting TX DC location used by the transmitter when multiple BWPs are configured in each of multiple CCs.

Embodiments of the present disclosure provide specific improvements to communication between UEs and network nodes in a wireless network, such as by providing, enabling, and/or facilitating solutions to overcome exemplary problems summarized above and described in more detail below.

Embodiments include methods (e.g., procedures) for a UE to transmit UL data to a wireless network (e.g., E-UTRAN, NG-RAN) using CA. These exemplary methods can include determining active UL BWPs associated with at least two CCs with a frequency band, and determining at least one UL TX DC location for the active UL BWPs. These exemplary methods can also include selectively sending, to the wireless network, an indication of the at least one UL TX DC location. In some embodiments, these exemplary methods can also include transmitting, to the network node via the active BWPs, data arranged in at least one OFDM symbol having the respective at least one UL TX DC location.

In some embodiments, determining at least one UL TX DC location can determining first and second UL TX DC locations that are associated with respective first and second non-overlapping subsets of the plurality of CCs.

In some embodiments, these exemplary methods can also include receiving, from the wireless network, an UL configuration including:
 a plurality of CCs within the frequency band, including the at least two CCs; and
 a plurality of UL BWPs associated with each of the CCs, including the active UL BWPs.

In some of these embodiments, determining the active UL BWPs can include, after expiration of a timer associated with a particular one of the plurality of CCs, selecting a default one of the plurality of UL BWPs associated with the particular CC as the active UL BWP associated with the particular CC. In such embodiments, selectively sending the indication can include refraining from sending an indication of the at least one UL TX DC location determined based on the default UL BWP.

In other embodiments, determining the active UL BWPs can include receiving, from the network node, a BWP switching command indicating the active UL BWPs. The indication can be sent in response to the BWP switching command.

In other embodiments, these exemplary methods can also include receiving, from the wireless network, a request for a UE TX DC location for the UE's active UL BWPs. In such embodiments, the indication can be sent in response to the request.

In some of these embodiments, the request can indicate a particular one of the plurality of UL TX DC locations. In such embodiments, selectively sending an indication can include sending an indication of only the requested UL TX DC location.

In other of these embodiments, the request is for all UL TX DC locations that have changed. In such embodiments, selectively sending an indication can include identifying one of more of the determined UL TX DC locations that are different than corresponding one or more most recent UL TX DC locations, and sending an indication of only the one or more UL TX DC locations that are different.

In some embodiments, selectively sending an indication can include refraining from sending the indication based on determining one of the following: the UE sent a previous indication of at least one UL TX DC location to the wireless network within a previous duration; or the at least one UL TX DC location has not changed since a previous indication sent by the UE to the wireless network.

In some embodiments, the at least one UL TX DC location can include a first UL TX DC location associated with a master cell group (MCG) provided by a master node (MN) in the wireless network, and a second UL TX DC location associated with a secondary cell group (SCG) provided by a secondary node (SN) in the wireless network. In some variants, the indication of the first and second UL TX DC locations can be sent to the MN via a first signaling radio bearer (SRB). In other variants, the indication of the first UL TX DC location can be sent to the MN via the first SRB, and the indication of the second UL TX DC location can be sent to the SN via a second SRB.

In some embodiments, for each of the at least one UL TX DC locations, the indication can include a sub-carrier index associated with a particular active BWP and an absolute frequency corresponding to a lowest frequency of the frequency band.

In other embodiments, for each of the at least one UL TX DC locations, the indication can include a sub-carrier index associated with a particular active BWP, a first absolute frequency corresponding to a lowest frequency of the active UL BWP that is lowest in the frequency band, and a second absolute frequency corresponding to a highest frequency of the active UL BWP that is highest in the frequency band.

In some of these embodiments, for each of the at least one UL TX DC locations, the indication can also include a sub-carrier spacing associated with the particular active BWP.

Other embodiments include methods (e.g., procedures) for a wireless network to receive UL data from a UE based on CA. These exemplary methods can be performed by one or more network nodes (e.g., base stations, eNBs, gNBs, ng-eNBs, MN, SN, etc., or component thereof) in the wireless network (e.g., E-UTRAN, NG-RAN).

These exemplary methods can include sending, to the UE, an UL configuration including a plurality of CCs within a frequency band and a plurality of UL BWPs associated with each of the CCs. These exemplary methods can also include selectively receiving, from the UE, an indication of at least one UL TX DC location for the UE's active UL BWPs associated with at least two of the CCs. In some embodiments, these exemplary methods can also include receiving, from the UE via the active UL BWPs, data arranged in at least one OFDM symbol having the respective at least one UL TX DC location.

In some embodiments, the indication indicates first and second UL TX DC locations that are associated with respective first and second non-overlapping subsets of the plurality of CCs.

In some embodiments, selectively receiving an indication can include receiving no indication of the at least one UL TX DC location when the at least one UL TX DC location is based on a default one of the plurality of UL BWPs associated with one of the plurality of CCs.

In other embodiments, these exemplary methods can also include sending, to the UE, a BWP switching command indicating the active UL BWPs. The indication can be received in response to the BWP switching command. In some variants, these exemplary methods can also include determining that the UE has selected a default one of the UL BWPs associated with a particular one of the CCs as an active UL BWP for the particular CC. The BWP switching command can be sent in response to determining that the UE has selected the default UL BWP. In other embodiments, these exemplary methods can also include sending, to the UE, a request for a UE TX DC location for the UE's active UL BWPs. The indication can be received in response to the request.

In some of these embodiments, the request can indicate a particular requested UL TX DC location and the indication indicates only the requested UL TX DC location. In other of these embodiments, the request is for all UL TX DC locations that have changed and the indication indicates only one or more UL TX DC locations for the UE that are different than corresponding one or more most recent UL TX DC locations for the UE.

In some embodiments, these exemplary methods can also include determining whether the UE's active UL BWPs are identical to a previous combination of active UL BWPs for which at least one TX DC location was received from the UE and stored by the network node. When the UE's active UL BWPs are identical to the previous combination, the wireless network can refrain from requesting the UE TX DC location and retrieve the stored at least one TX DC location. On the other hand, the request can be sent when the UE's active UL BWPs are not identical to the previous combination.

In some embodiments, selectively receiving an indication can include receiving the indication only when one or more of the following applies:
  a previous indication of at least one UL TX DC location was not received from the UE within a previous duration (e.g., before receiving the indication); or
  the indicated at least one UL TX DC location has changed since a previous indication received from the UE.

In some embodiments, the at least one UL TX DC location can include a first UL TX DC location associated with an MCG provided by an MN in the wireless network, and a second UL TX DC location associated with an SCG provided by an SN in the wireless network. In some variants, the indication of the first and second UL TX DC locations can be received by the MN via a first SRB. In other variants, the indication of the first UL TX DC location can be received by the MN via the first SRB, and the indication of the second UL TX DC location can be received by the SN via a second SRB.

In various embodiments, the received indication can have any of the formats and/or contents summarized above in relation to UE embodiments.

Other embodiments include UEs (e.g., wireless devices, IoT devices, etc. or components thereof) and wireless networks (e.g., including nodes such as base stations, eNBs, gNBs, ng-eNBs, MN, SN, etc., or components thereof) configured to perform operations corresponding to any of the exemplary methods described herein. Other embodiments include non-transitory, computer-readable media storing program instructions that, when executed by processing circuitry, configure such UEs or wireless networks to perform operations corresponding to any of the exemplary methods described herein.

These and other embodiments described herein provide flexible and efficient techniques for UE reporting of UL TX DC locations such that signaling complexity and/or overhead is minimized and/or reduced while providing sufficient flexibility for UEs to place TX DC locations according to their particular implementations. Such techniques can facilitate increased use of intra-band CA with active BWPs on each of a plurality of CCs, which can result in increased UL data rate without excessive UE energy consumption.

These and other objects, features, and advantages of embodiments of the present disclosure will become apparent upon reading the following Detailed Description in view of the Drawings briefly described below.

BRIEF DESCRIPTION OF THE DRAWINGS

FIG. 4 shows an exemplary intra-band CA arrangement in which a UE is configured with three CCs in a single frequency band.

FIG. 5 shows an exemplary ASN. 1 data structure for an UplinkTxDirectCurrentList RRC information element (IE).

FIG. 6 illustrates how a UE's uplink TX DC location can change based on changes to active BWPs in intra-band CA.

FIG. 7 shows an ASN.1 data structure for an exemplary UplinkTxDirectCurrentUL-CA IE, according to various embodiments of the present disclosure.

FIG. 8 illustrates an intra-band CA arrangement in which different active BWPs in one CC result in the same TX DC location, according to various embodiments of the present disclosure.

FIG. 9 shows an ASN.1 data structure for another exemplary UplinkTxDirectCurrentUL-CA IE, according to various embodiments of the present disclosure.

DETAILED DESCRIPTION

Figure 1:
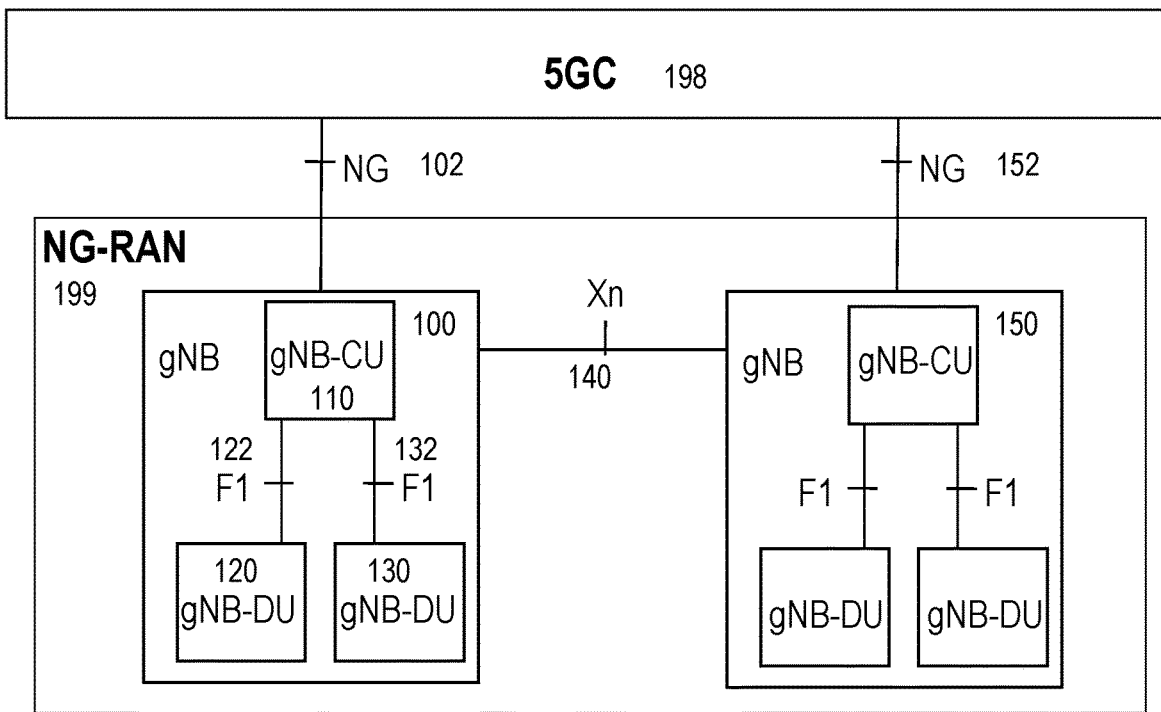
FIGS. 1-2 show two high-level views of an exemplary 5G/NR network architecture.
Figure 2:
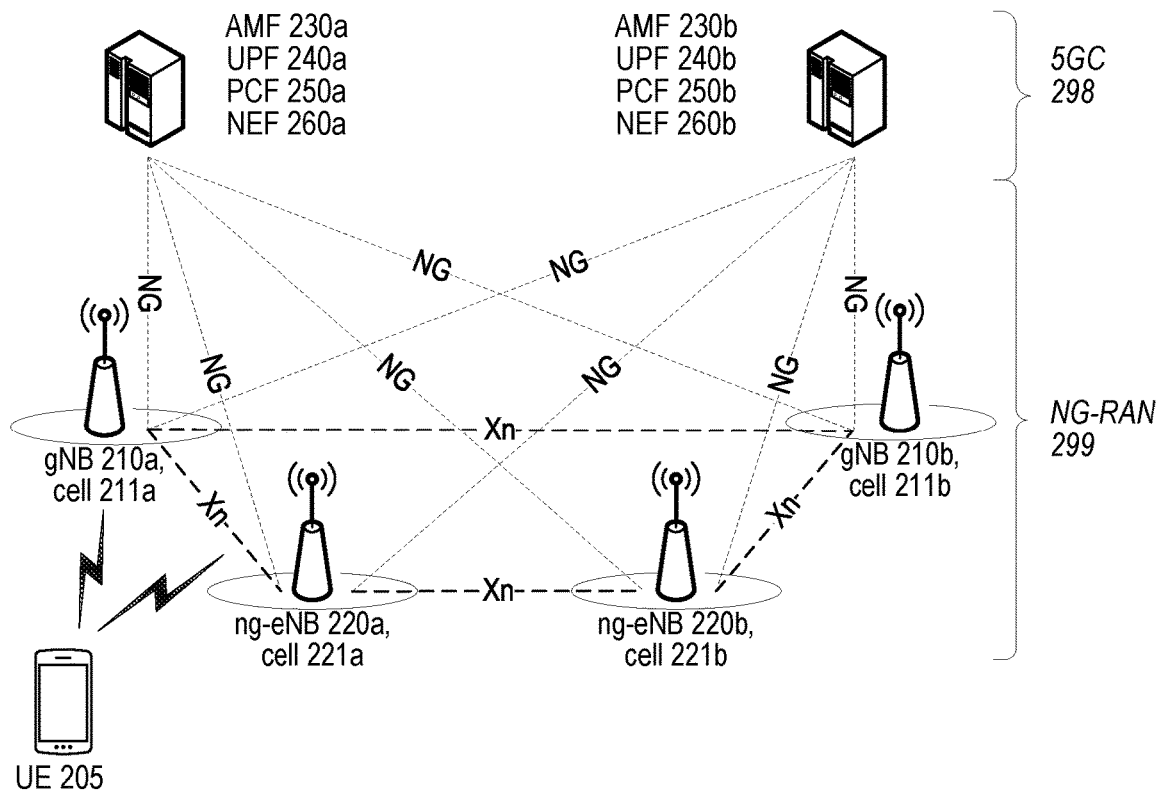

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where a step must necessarily follow or precede another step due to some dependency. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Furthermore, the following terms are used throughout the description given below:

Radio Node: As used herein, a "radio node" can be either a radio access node or a wireless device."

Node: As used herein, a "node" can be a network node or a wireless device.

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., CU and DU), a high-power or macro base station, a low-power base station (e.g., micro, pico, femto, or home base station, or the like), an integrated access backhaul (IAB) node, a transmission point, a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a Packet Data Network Gateway (P-GW), an access and mobility management function (AMF), a session management function (AMF), a user plane function (UPF), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc. Unless otherwise noted, the term "wireless device" is used interchangeably herein with the term "user equipment" (or "UE" for short).

Network Node: As used herein, a "network node" is any node that is either part of the radio access network (e.g., a radio access node or equivalent name discussed above) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

As briefly mentioned above, NR supports the combined use of carrier aggregation (CA) and bandwidth parts (BWPs). For example, a UE can be configured with multiple component carriers (CCs) and up to four DL and four UL BWPs on each CC. The UE can have one configured DL BWP and one configured UL BWP active on each CC at any given time. This can result in various problems, difficulties, and/or issues with intra-band CA, particularly in relation to determining and/or reporting TX DC location used by the transmitter when multiple BWPs are configured in each of multiple CCs. This is discussed in more detail below.

Figure 3:
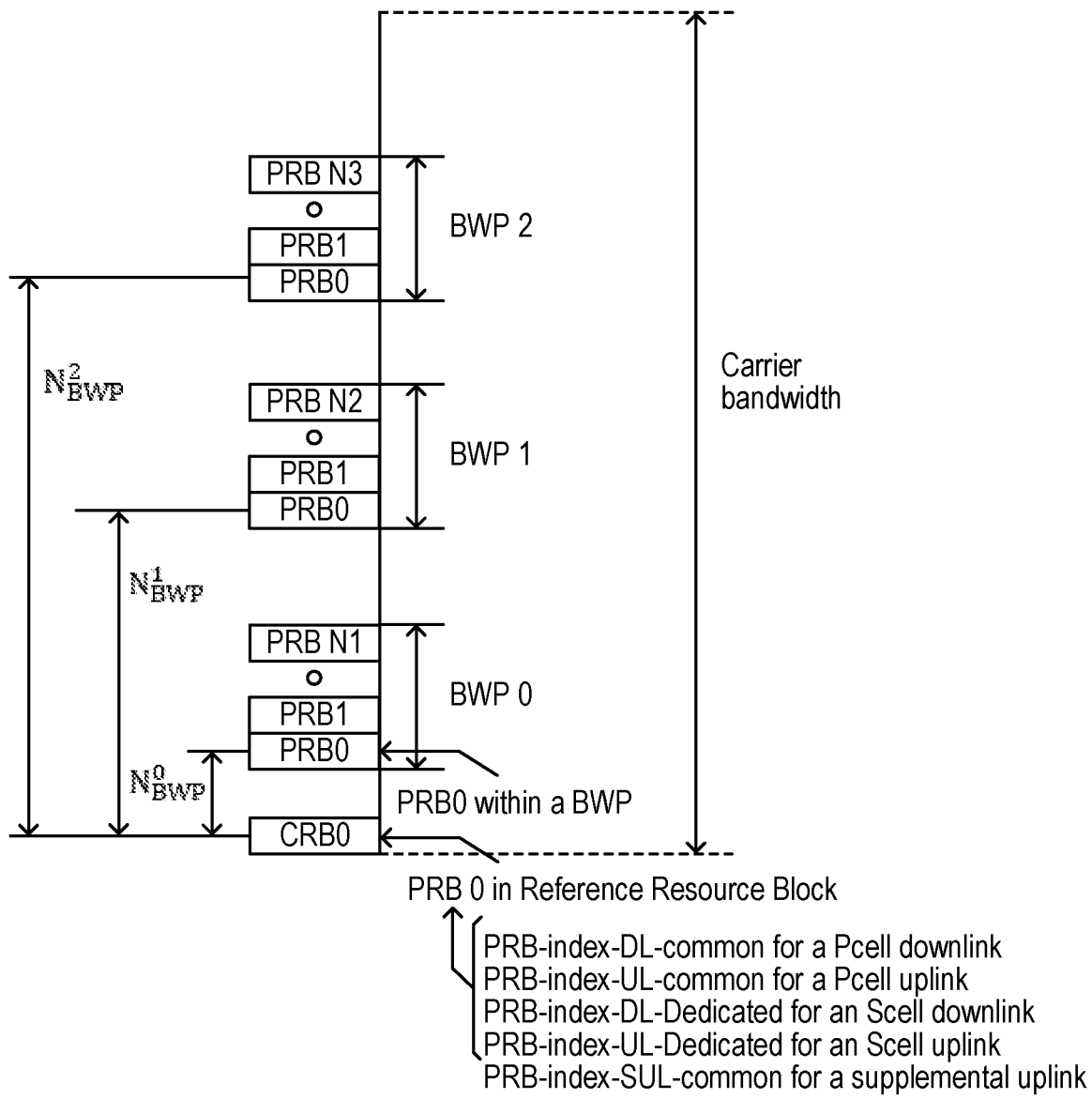
FIG. 3 shows an exemplary frequency-domain configuration for a 5G/NR UE.

FIG. 3 shows an exemplary frequency-domain configuration for an NR UE. In Rel-15 NR, a UE can be configured with up to four carrier bandwidth parts (BWPs) in the DL with a single DL BWP being active at a given time. A UE can be configured with up to four BWPs in the UL with a single UL BWP being active at a given time. If a UE is configured with a supplementary UL, the UE can be configured with up to four additional BWPs in the supplementary UL, with a single supplementary UL BWP being active at a given time. In the exemplary arrangement of FIG. 5, the UE is configured with three DL (or UL) BWPs, labelled BWP 0-2, respectively.

Common RBs (CRBs) are numbered from 0 to the end of the carrier bandwidth. Each BWP configured for a UE has a common reference of CRB0 (as shown in FIG. 5), such that a configured BWP may start at a CRB greater than zero. CRB0 can be identified by one of the following parameters provided by the network, as further defined in 3GPP TS 38.211 section 4.4:

PRB-index-DL-common for DL in a primary cell (PCell, e.g., PCell or PSCell);

PRB-index-UL-common for UL in a PCell;

PRB-index-DL-Dedicated for DL in a secondary cell (SCell);

PRB-index-UL-Dedicated for UL in an SCell; and

PRB-index-SUL-common for a supplementary UL.

In this manner, a UE can be configured with a narrow BWP (e.g., 10 MHz) and a wide BWP (e.g., 100 MHz), each starting at a particular CRB, but only one BWP can be active for the UE at a given point in time. In the arrangement shown in FIG. 5, BWPs 0-2 start at CRBs $N^0_{BWP}$, $N^1_{BWP}$, and $N^2_{BWP}$, respectively. Within a BWP, PRBs are defined and numbered in the frequency domain from 0 to $N_{BWPj}^{size}-1$, where i is the index of the particular BWP for the carrier. In the arrangement shown in FIG. 3, BWPs 0-2 include PRBs 0 to N1, N2, and N3, respectively.

Each NR resource element (RE) corresponds to one OFDM subcarrier during one OFDM symbol interval. A resource block (RB) consists of a group of 12 contiguous OFDM subcarriers for a duration of a slot, which is 14 OFDM symbols for normal cyclic prefix and 12 OFDM to symbols for extended cyclic prefix.

NR supports various SCS values $\Delta f=(15\times 2^\mu)$ kHz, where $\mu \in (0,1,2,3,4)$ are referred to as "numerologies." Numerology $\mu=0$ (i.e., $\Delta f=15$ kHz) provides the basic (or reference) SCS that is also used in LTE. The symbol duration, cyclic prefix (CP) duration, and slot duration are inversely related to SCS or numerology. For example, there is one (1-ms) slot per subframe for $\Delta f=15$ kHz, two 0.5-ms slots per subframe for $\Delta f=30$ kHz, etc. In addition, the maximum carrier bandwidth is directly related to numerology according to $2^\mu * 50$ MHz. Table 1 below summarizes the supported NR numerologies and associated parameters. Different DL and UL numerologies can be configured by the network.

TABLE 1

| μ | $\Delta f = 2^\mu \cdot 15$ (kHz) | Cyclic prefix (CP) | CP duration | Symbol duration | Symbol + CP | Slot duration | Max carrier BW |
|---|---|---|---|---|---|---|---|
| 0 | 15 | Normal | 4.69 μs | 66.67 μs | 71.35 μs | 1 ms | 50 MHz |
| 1 | 30 | Normal | 2.34 μs | 33.33 μs | 35.68 μs | 0.5 ms | 100 MHz |
| 2 | 60 | Normal, Extended | 1.17 μs | 16.67 μs | 17.84 μs | 0.25 ms | 200 MHz |
| 3 | 120 | Normal | 0.59 μs | 8.33 μs | 8.92 μs | 125 μs | 400 MHz |
| 4 | 240 | Normal | 0.29 μs | 4.17 μs | 4.46 μs | 62.5 μs | 800 MHz |

As mentioned above, NR supports the combined use of carrier aggregation (CA) and bandwidth parts (BWPs). FIG. 4 shows an exemplary intra-band CA arrangement whereby a UE is configured with three CCs in a single frequency band, labeled CCi, i=1-3. The UE is also configured with four BWPs in each CCi, labelled Bj,i, j=1-4. A single BWP is shown as active for each CC, in particular B1.3, B2.3, and B3.2. Note that the arrangement shown in FIG. 4 can apply to DL or UL.

As briefly mentioned above, an NR transmitter informs the receiver whether the transmit DC subcarrier is present in a particular BWP and, if so, its subcarrier location (also referred to as "TX DC location"). FIG. 5 shows an exemplary ASN.1 data structure for an UplinkTxDirectCurrentList RRC information element (IE), whereby a UE reports TX DC locations for each configured UL BWP in each of the UE's serving cells. This IE can be included in messages such as RRCReconfigurationComplete and RRCResumeComplete.

In FIG. 5, the field txDirectCurrentLocation contains a DC subcarrier location for a single UL BWP on a single CC/cell in the form of an OFDM subcarrier index between 0 and 3299, which is also based on the numerology of the particular UL BWP. This field can also have values 3300, which indicates "Outside the carrier", and 3301, which indicates "Undetermined position within the carrier". The UE's TX DC locations depends on RF bandwidth that UE configures in its real implementation. For example, if the UE uses a single power amplifier (PA), the UE may have a single TX DC location for all active BWPs.

In the case of intra-band UL CA, however, TX DC location depends on the activated BWPs. For example, a UE can either reconfigure its RF bandwidth based on activated BWPs or maintain RF bandwidth based on widest bandwidth of all CCs. In the case of BWPs activated in multiple CCs, such as shown in FIG. 4, a TX DC location can be outside of any CC configured for the UE. FIG. 6 illustrates this issue with two CCs and different active BWPs. In both cases, the UE's TX location (shown by the dashed arrow) is outside of any active BWPs, but it differs based on which BWPs are activated in each CC.

Note that the examples shown in FIG. 6 can represent a UE implementation of a single PA with a single TX DC location. For two CCs (as shown in FIG. 6) and four configured BWPs, there are 16 different combinations of two simultaneously active BWPs, each of which may have a different TX DC location. In the case of a dual-PA implementation (e.g., one PA for CC1 and a second PA for CC2), there can be one TX DC location associated with each PA. The complexity grows exponentially with the number of CCs, e.g., there are 64 different combinations of three simultaneously active BWPs in the arrangement shown in FIG. 4.

These issues can create various difficulties for UE reporting of UL TX DC location(s). The following two candidate solutions for enhancing TX DC location signaling to accommodate UL CA are under discussion in 3GPP:

Report TX DC location after every activation of BWPs including CC activation, BWP switching procedure, etc.

Report each TX DC location based on permutations of all possible simultaneously activated BWPs within configured BWPs.

Even so, it is unclear how to design these candidate solutions to be efficient and/or scalable.

Accordingly, embodiments of the present disclosure provide flexible and efficient techniques for UE reporting of UL TX DC locations such that signaling complexity and/or overhead is minimized and/or reduced while providing sufficient flexibility for UEs to place TX DC locations according to their particular implementations. Such techniques include the following high-level embodiments:

UE reporting TX DC location(s) upon request from the network (e.g., serving gNB);
UE reporting TX DC location without explicit request from the network;
UE reporting of TX DC location in Dual Connectivity (DC) scenarios;
UE selectively reporting a subset of all TX DC location based on rules and/or on indications in a network request; and
UE TX DC location placement dependent on highest and lowest used frequency points. These are discussed in more detail below.

In some embodiments, the network (e.g., serving gNB) can transmit a request (e.g., via RRC message) for the UE to report the TX DC location for the currently activated BWP(s) on all the UE's CCs. The UE report can be sent in a responsive message (e.g., RRC). In one example, the request can be an RRC UEInformationRequest message and the report can be sent in an RRC UEInformationResponse message. In some embodiments, the UE can report such information based on a newly defined IE, e.g., UplinkTx-DirectCurrentUL-CA.

As mentioned above, the purpose of reporting UL TX DC location is to mitigate problems due to the local oscillator (LO) leakage. Particularly for higher-order modulation formats like 256 QAM, LO leakage can be large enough to impact the UL receive performance. On the other hand, upon configuration of a new CC and/or BWP, 256 QAM may not be scheduled immediately in that CC and/or BWP. Furthermore, it is possible that a UE's TX LO report may be used by the gNB for improving the receive performance for that UE only after an evaluation period (e.g., based on actual UL performance). In other words, acquiring the UE's TX DC location may not be time-critical for the gNB, and before the gNB knows the UE's exact TX DC location, it can assume a value of 3300 (outside of the carrier) or 3301 (undetermined position within the carrier). Thus, a request/response approach via relatively slow RRC signaling can be used.

In some embodiments, the network (e.g., serving gNB) can transmit a request only if it is aware that the UE's active BWPs have been changed. Typically, a gNB knows the currently active BWPs of each UE based on BWP switching commands (e.g., via RRC, MAC CE, and/or DCI) sent to each served UE by the gNB. In some error cases, however, a UE may not have properly received a DL assignment or an UL grant in an active BWP, causing the UE's BWP inactivity timer to expire and the UE switching to a default (e.g., initial) BWP. Given this UE-autonomous BWP switching, the gNB does not know exactly but can determine and/or infer that the UE's active BWP(s) have changed.

In some embodiments, the network (e.g., serving gNB) can store TX DC locations reported by a UE for respective combinations of the UE's active BWPs. In such case, the gNB does not request UE UL TX DC location for a subsequent configuration of active BWPs that matches one of the stored combinations. Instead, the gNB relies on the stored TX DC location for that combination.

In other embodiments, a UE can transmit an UL TX DC location when active BWPs have changed on any of the UE's CCs, without any explicit request from the network (e.g., unsolicited). In one variant, the UE does not (re)send TX DC location for its current configuration of active BWPs when at least one of the following conditions are met:

the UE sent the TX DC location for the same configuration within a previous duration (e.g., predetermined or network-configured); and
the UE does not change its most recent TX DC location upon change to the current configuration.

In another variant, a UE can transmit an UL TX DC location without an explicit request, but only when active BWPs on any CCs have changed as a result of a BWP switching command from the serving gNB. A BWP switching command can include any of the following:

PDCCH downlink control information (DCI) indicating a DL assignment or an UL grant can include a "bandwidth part indicator" field used to indicate a BWP to be activated in connection with the assignment or grant. For example, entering or leaving dormant BWPs for SCells can be done by BWP switching on instruction from PDCCH.

MAC CE, e.g., for activation/deactivation of SCells.

RRC signaling, e.g., for (re)configuring a serving cell with different default/initial BWPs, adding/removing serving cells, etc.

In these variants, the UE does not transmit an unsolicited UL TX DC location in response to UE-autonomous BWP switching, such as upon expiration of a BWP inactivity timer expiry or an SCell deactivation timer. In such case, the gNB and the UE are out-of-sync on which BWPs the UE will use for its UL transmission, but in general the UE will fall back to an initial or default BWP. If the gNB is not already aware of the TX DC location(s) for the UE's initial or default BWPs, it can send the UE a command (e.g., via DCI) to switch to currently active BWPs (i.e., from gNB's perspective), which can trigger the UE to report a TX DC location.

A dual connectivity (DC) framework was introduced in LTE Rel-12. DC refers to a mode of operation in which a UE, in RRC_CONNECTED state, consumes radio resources provided by at least two different network points connected to one another with a non-ideal backhaul. In the LTE standards, these two network points may be referred to as a "Master eNB" (MeNB) and a "Secondary eNB" (SeNB). More generally, they can be referred to as a master node (MN) and a secondary node (SN). DC can be viewed as a special case of CA in which the aggregated carriers (or cells) are provided by network nodes that are physically separated and not connected via a robust, high-capacity connection.

More specifically, in DC, the UE is configured with a Master Cell Group (MCG) and a Secondary Cell Group (SCG). A Cell Group (CG) is a group of serving cells served by a single node and includes one MAC entity, a set of logical channels with associated RLC entities, a primary cell, and optionally one or more SCells. The MCG is associated with the MeNB and includes a PCell and optionally one or more SCells. The SCG is associated with the SeNB and includes a Primary SCell (PSCell) and optionally one or more SCells. The term "Special Cell" (or "SpCell" for short) refers to the PCell of the MCG or the PSCell of the SCG depending on whether the UE's MAC entity is associated with the MCG or the SCG, respectively. An SpCell is always activated and supports physical uplink control channel (PUCCH) transmission and contention-based random access (CBRA) by UEs.

DC is also envisioned as an important feature for 5G/NR networks. Several DC (or more generally, multi-connectivity) scenarios have been considered for NR. These include NR-DC that is similar to LTE-DC discussed above, except that both the MN and SN (referred to as "MgNB" and "SgNB") employ the NR interface to communicate with the UE. In addition, various multi-RAT DC (MR-DC) scenarios have been considered, whereby a compatible UE can be configured to utilize resources provided by two different nodes, one providing E-UTRA/LTE access and the other one providing NR access. One node acts as the MN (e.g., providing the MCG) and the other as the SN (e.g., providing the SCG).

Logical channel communications between a UE and a gNB are via radio bearers. Signaling radio bearer SRB0 is used for RRC connection setup, resume, and re-establishment. Once any of these operations has succeeded, SRB1 carries RRC and non-access stratum (NAS) messages prior to establishment of SRB2. SRB2 is used for NAS messages and lower-priority RRC messages (e.g., logged measurement information). SRB0/SRB1 are also used for establishment and modification of data radio bearers (DRBs) for carrying user data between the UE and gNB. SRB3 is used for specific RRC messages while a UE is in DC.

In some DC-related embodiments, a UE can have a unique UL TX DC location for active BWPs associated with each DC cell group, e.g., MCG and SCG. The UE can report (e.g., in respective UplinkTxDirectCurrentUL-CA IEs in an RRC message) the UL TX DC locations for the respective cell groups. In some embodiments, if the UL RRC message is sent on SRB1 via MCG, then the IE needs to indicate to which cell group(s) the reported TX DC location applies (e.g., by including and/or associating a cell group ID). The network node providing the UE's MCG forwards the UE-reported SCG UL TX DC location to the network node providing the SCG, e.g., via the Xn interface. In other embodiments, an associated cell group can be inferred from a TX DC location based on it being close to or within the frequency range of the band containing the intra-band CA for that cell group.

In other embodiments, the UE can send an RRC message including MCG TX DC location on SRB1 and an RRC message including SCG TX DC location on SRB3. For example, if the existing UEInformationResponse message should be used (e.g., with modifications as needed), then the 3GPP TS 38.331 specification can be modified to allow this message to be sent on SRB3 based on a need to report TX DC location for the SCG.

In some embodiments, a UE can refrain from reporting an UL TX DC location that it previously reported. For example, the UE can refrain from such duplicate reporting for a duration that can be predetermined or configured by the network. As a more specific example, the UE can refrain from duplicate reporting of an UL TX DC location while it is connected to the same cell or gNB as when it first reported the UL TX DC location. As another specific example, if the UE has a TX DC location for band A and a TX DC location for band B, and the TX DC location for band B changes while TX DC for band A does not, the UE reports only the TX DC of band A.

In some embodiments, the network can configure the UE's use of such selective TX DC location reporting. For example, the network may configure whether the UE reports all TX DC locations or only reports the ones that have changed, e.g., since the last report.

Selective UE reporting of UL TX DC location can also be based on network request. For example, in a request message, the network can indicate whether it wants all UL TX DC locations or only those that have changed. Alternately, the network explicitly requests particular TX DC locations, such as by including an index of the particular TX DC locations, by identifying a band/CC/BWP of interest, etc.

As discussed above, the UE's UL TX DC location (e.g., for each cell group in DC) can be in any frequency location, including within BWPs not configured for the UE or at a frequency location that is not supported in a non-contiguous intra-band UL CA arrangement. In some embodiments, the UE can report the UL TX DC location for intra-band CA as the index of the DC subcarrier (e.g., as in txDirectCurrent-Location) for a BWP together with the absolute frequency location of the start of the carrier. In other embodiments, the SCS can also be included since each BWP in the txDirect-CurrentLocation can have different configurations of subcarrier spacing. In such embodiments, only code points (0 .

. . 3299) are needed for txDirectCurrentLocation since the values 3300 (which currently indicates "Outside the carrier") and 3301 (which currently indicates "Undetermined position within the carrier") are not needed. FIG. 7 shows an ASN.1 data structure for an exemplary UplinkTxDirectCurrentUL-CA IE according to these embodiments.

UEs that use a dual PA architecture for CA typically have two or more DC subcarrier locations, i.e., at least one for each PA. In some embodiments, the UE can report a PA identifier associated with each TX DC location. This can reduce signaling overhead when the TX DC location for one PA is reported (e.g., based on a change) while the TX DC location for the other PA is not.

Generalizing the examples shown in FIGS. 4 and 6, if a UE is configured with N CCs/cells and each CC/cell is configured with M UL BWPs, then there are approximately MN combinations of N active BWPs. For example, there are 65536 permutations for 8 CCs/cells with 4 BWPs per CC/cell. Efficient techniques for reporting UL TX DC location for the respective combinations is needed.

In some embodiments, the UE RF bandwidth can be determined from the lowest frequency of the active BWP lowest within the frequency band, to the highest frequency of the active BWP highest within the frequency band. In such embodiments, the number of possible TX DC locations is roughly equal to $$\sum_{n=1}^{n=N-1} M * M * n.$$

For M=8 CCs/cells and four BWPs configured per cell, this relation results in 448 possible TX DC locations. FIG. 8 illustrates an arrangement with two CCs, in which different active BWPs in CC1 (which is lower in the frequency band) result in the same TX DC location because the two different active BWPs have the same lowest frequency.

In some embodiments, a UE can report a list of UL TX DC locations, with each reported UL TX DC locations associated with a particular lowest frequency of the lowest active BWP and a particular highest frequency of the highest active BWP. Furthermore, each reported UL TX DC location is the same for all combinations of active BWPs that these particular lowest and highest frequencies. FIG. 9 shows an ASN.1 data structure for an exemplary UplinkTxDirectCurrentUL-CA IE according to these embodiments.

These embodiments can be applied to all intra-band CCs configured for a UE, or only a subset of such intra-band CCs. For example, a UE can report a first TX DC location (e.g., as in FIG. 9) based on the combination of CC1 and CC2 and a second TX DC location based on the combination of CC3 and CC4. Additionally, this technique can be used for a combination of inter- and intra-band CA, e.g., when CC1 and CC2 are in one band while CC3 and CC4 are in a different band.

Figure 10:
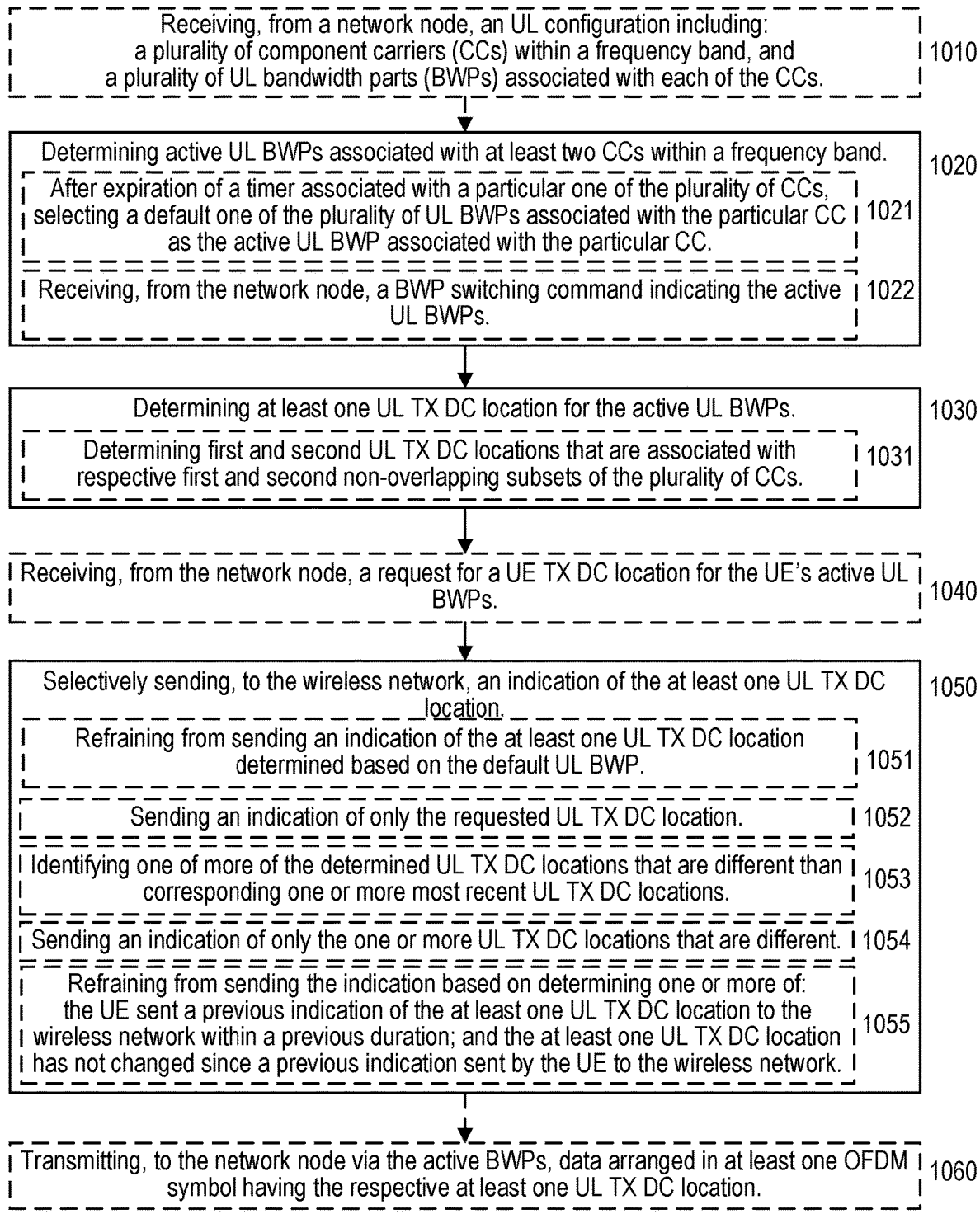
FIG. 10 is a flow diagram of an exemplary method for a UE (e.g., wireless device, IoT device, etc.), according to various embodiments of the present disclosure.
Figure 11:
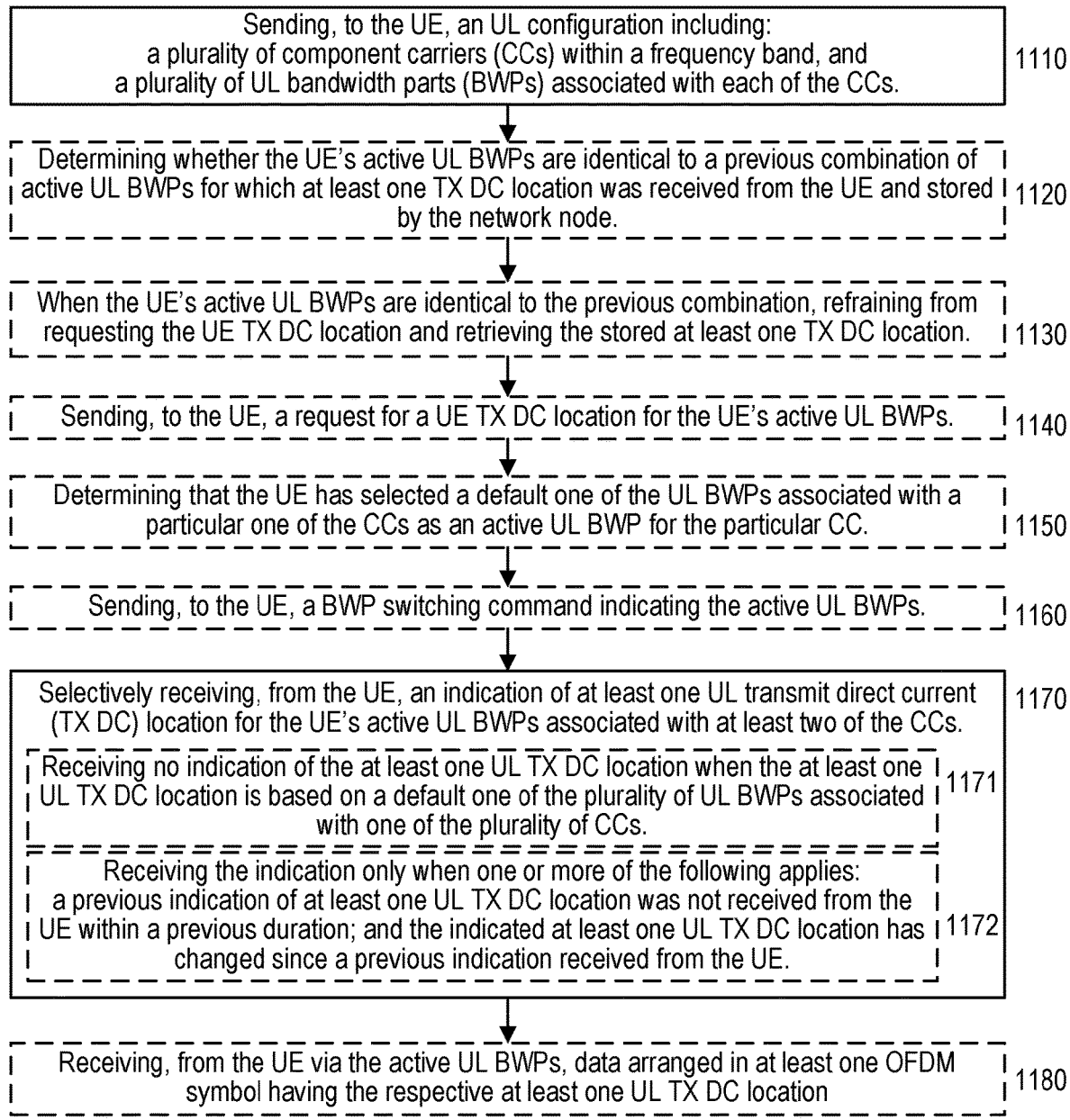
FIG. 11 is a flow diagram of an exemplary method for a wireless network (e.g., NG-RAN, E-UTRAN), according to various embodiments of the present disclosure.

Various features of the embodiments described above correspond to various operations illustrated in FIGS. 10-11, which show exemplary methods (e.g., procedures) for a UE and a wireless network, respectively. In other words, various features of the operations described below correspond to various embodiments described above. Furthermore, the exemplary methods shown in FIGS. 10-11 can be used cooperatively to provide various exemplary benefits described herein. Although FIGS. 10-11 show specific blocks in particular orders, the operations of the exemplary methods can be performed in different orders than shown and can be combined and/or divided into blocks having different functionality than shown. Optional blocks or operations are indicated by dashed lines.

In particular, FIG. 10 shows an exemplary method (e.g., procedure) to transmit UL data to a wireless network using CA, according to various embodiments of the present disclosure. The exemplary method can be performed by a UE (e.g., wireless device, IoT device, etc.), such as described elsewhere herein.

The exemplary method can include the operations of block 1020, where the UE can determine active UL BWPs associated with at least two CCs with a frequency band. The exemplary method can also include the operations of block 1030, where the UE can determine at least one UL TX DC location for the active UL BWPs. The exemplary method can also include the operations of block 1050, where the UE can selectively send, to the wireless network, an indication of the at least one UL TX DC location. In some embodiments, the exemplary method can also include the operations of block 1060, where the UE can transmit, to the wireless network via the active BWPs, data arranged in at least one OFDM symbol having the respective at least one UL TX DC location.

In some embodiments, determining at least one UL TX DC location in block 1030 includes the operations of sub-block 1031, where the UE can determine first and second UL TX DC locations that are associated with respective first and second non-overlapping subsets of the plurality of CCs.

In some embodiments, the exemplary method can also include the operations of block 1010, where the UE can receive, from the wireless network, an UL configuration including:
   a plurality of CCs within the frequency band, including the at least two CCs; and
   a plurality of UL BWPs associated with each of the CCs, including the active UL BWPs.
In some of these embodiments, determining the active UL BWPs in block 1020 can include the operations of sub-block 1021, where the UE can, after expiration of a timer associated with a particular one of the plurality of CCs, select a default one of the plurality of UL BWPs associated with the particular CC as the active UL BWP associated with the particular CC. In such embodiments, selectively sending the indication in block 1050 includes the operations of sub-block 1051, where the UE can refrain from sending an indication of the at least one UL TX DC location determined based on the default UL BWP.

In other embodiments, determining the active UL BWPs in block 1020 can include the operations of sub-block 1022, where the UE can receive, from the network node, a BWP switching command indicating the active UL BWPs. The indication can be sent (e.g., in block 1050) in response to the BWP switching command.

In other embodiments, the exemplary method can also include the operations of block 1040, where the UE can receive, from the wireless network, a request for a UE TX DC location for the UE's active UL BWPs. In such embodiments, the indication can be sent (e.g., in block 1050) in response to the request.

In some of these embodiments, the request (e.g., in block 1040) can indicate a particular one of the plurality of UL TX DC locations. In such embodiments, selectively sending in block 1050 can include the operations of sub-block 1052, where the UE can send an indication of only the requested UL TX DC location.

In other of these embodiments, the request is for all UL TX DC locations that have changed. In such embodiments, selectively sending in block 1050 can include the operations of sub-blocks 1053-1054, where the UE can identify one of more of the determined UL TX DC locations that are different than corresponding one or more most recent UL TX DC locations, and send an indication of only the one or more UL TX DC locations that are different.

In some embodiments, selectively sending in block 1050 can include the operations of sub-block 1055, where the UE can refrain from sending the indication based on determining one of the following: the UE sent a previous indication of at least one UL TX DC location to the wireless network within a previous duration; or the at least one UL TX DC location has not changed since a previous indication sent by the UE to the wireless network.

In some embodiments, the at least one UL TX DC location can include a first UL TX DC location associated with an MCG provided by an MN in the wireless network, and a second UL TX DC location associated with an SCG provided by an SN in the wireless network. In some variants, the indication of the first and second UL TX DC locations can be sent to the MN via a first SRB (e.g., SRB1). In other variants, the indication of the first UL TX DC location is sent to the MN via the first SRB (e.g., SRB1), and the indication of the second UL TX DC location is sent to the SN via a second SRB (e.g., SRB3).

In some embodiments, for each of the at least one UL TX DC locations, the indication can include a sub-carrier index associated with a particular active BWP and an absolute frequency corresponding to a lowest frequency of the frequency band. FIG. 7 shows an example of these embodiments.

In other embodiments, for each of the at least one UL TX DC locations, the indication can include a sub-carrier index associated with a particular active BWP, a first absolute frequency corresponding to a lowest frequency of the active UL BWP that is lowest in the frequency band, and a second absolute frequency corresponding to a highest frequency of the active UL BWP that is highest in the frequency band. FIG. 9 shows an example of these embodiments.

In some of these embodiments, for each of the at least one UL TX DC locations, the indication can also include a sub-carrier spacing associated with the particular active BWP. These embodiments are illustrated by FIGS. 7 and 9.

In addition, FIG. 11 shows an exemplary method (e.g., procedure) for a wireless network to receive UL data from a UE based on CA, according to various embodiments of the present disclosure. The exemplary method can be performed by one or more network nodes (e.g., base station, eNB, gNB, ng-eNB, MN, SN, etc., or component thereof) in the wireless network (e.g., E-UTRAN, NG-RAN), such as described elsewhere herein.

The exemplary method can include the operations of block 1110, where the network node can send, to the UE, an UL configuration including a plurality of CCs within a frequency band and a plurality of UL BWPs associated with each of the CCs. The exemplary method can also include the operations of block 1170, where the wireless network can selectively receive, from the UE, an indication of at least one UL TX DC location for the UE's active UL BWPs associated with at least two of the CCs. In some embodiments, the exemplary method can also include the operations of block 1180, where the wireless network can receive, from the UE via the active UL BWPs, data arranged in at least one OFDM symbol having the respective at least one UL TX DC location.

In some embodiments, the indication indicates first and second UL TX DC locations that are associated with respective first and second non-overlapping subsets of the plurality of CCs.

In some embodiments, selectively receiving an indication in block 1170 includes the operations of sub-block 1171, where the wireless network can receive no indication of the at least one UL TX DC location when the at least one UL TX DC location is based on a default one of the plurality of UL BWPs associated with one of the plurality of CCs. For example, this can correspond to the UE operations in sub-block 1051.

In other embodiments, the exemplary method can also include the operations of block 1160, where the wireless network can send, to the UE, a BWP switching command indicating the active UL BWPs. The indication can be received (e.g., in block 1170) in response to the BWP switching command. In some variants, the exemplary method can also include the operations of block 1150, where the wireless network can determine that the UE has selected a default one of the UL BWPs associated with a particular one of the CCs as an active UL BWP for the particular CC. The BWP switching command can be sent (e.g., in block 1160) in response to determining that the UE has selected the default UL BWP.

In other embodiments, the exemplary method can also include the operations of block 1140, where the wireless network can send, to the UE, a request for a UE TX DC location for the UE's active UL BWPs. In such embodiments, the indication can be received (e.g., in block 1170) in response to the request.

In some of these embodiments, the request can indicate a particular requested UL TX DC location and the indication indicates only the requested UL TX DC location. In other of these embodiments, the request is for all UL TX DC locations that have changed and the indication indicates only one or more UL TX DC locations for the UE that are different than corresponding one or more most recent UL TX DC locations for the UE.

In some embodiments, the exemplary method can also include the operations of blocks 1120-1130. In block 1120, the wireless network can determine whether the UE's active UL BWPs are identical to a previous combination of active UL BWPs for which at least one TX DC location was received from the UE and stored by the network node. In block 1130, when the UE's active UL BWPs are identical to the previous combination, the wireless network can refrain from requesting the UE TX DC location and retrieve the stored at least one TX DC location. For example, the retrieved TX DC location(s) can be used for receiving the data in block 1180. On the other hand, the request can be sent (e.g., in block 1140) when the UE's active UL BWPs are not identical to the previous combination.

In some embodiments, selectively receiving an indication in block 1170 can include the operations of sub-block 1172, where the wireless network can receive the indication only when one or more of the following applies:

a previous indication of at least one UL TX DC location was not received from the UE within a previous duration (e.g., before receiving the indication in block 1170); or the indicated at least one UL TX DC location has changed since a previous indication received from the UE.

For example, these operations can correspond to UE operations in sub-block 1055.

In some embodiments, the at least one UL TX DC location can include a first UL TX DC location associated with an MCG provided by an MN in the wireless network, and a second UL TX DC location associated with an SCG provided by an SN in the wireless network. In some variants, the indication of the first and second UL TX DC locations can be received by the MN via a first SRB (e.g., SRB1). In other variants, the indication of the first UL TX DC location can be received by the MN via the first SRB (e.g., SRB1), and the indication of the second UL TX DC location can be received by the SN via a second SRB (e.g., SRB3).

In some embodiments, for each of the at least one UL TX DC locations, the indication can include a sub-carrier index associated with a particular active BWP and an absolute frequency corresponding to a lowest frequency of the frequency band. FIG. 7 shows an example of these embodiments.

In other embodiments, for each of the at least one UL TX DC locations, the indication can include a sub-carrier index associated with a particular active BWP, a first absolute frequency corresponding to a lowest frequency of the active UL BWP that is lowest in the frequency band, and a second absolute frequency corresponding to a highest frequency of the active UL BWP that is highest in the frequency band. FIG. 9 shows an example of these embodiments.

In some of these embodiments, for each of the at least one UL TX DC locations, the indication can also include a sub-carrier spacing associated with the particular active BWP. These embodiments are illustrated by FIGS. 7 and 9.

Although various embodiments are described above in terms of methods, techniques, and/or procedures, the person of ordinary skill will readily comprehend that such methods, techniques, and/or procedures can be embodied by various combinations of hardware and software in various systems, communication devices, computing devices, control devices, apparatuses, non-transitory computer-readable media, computer program products, etc.

Figure 12:
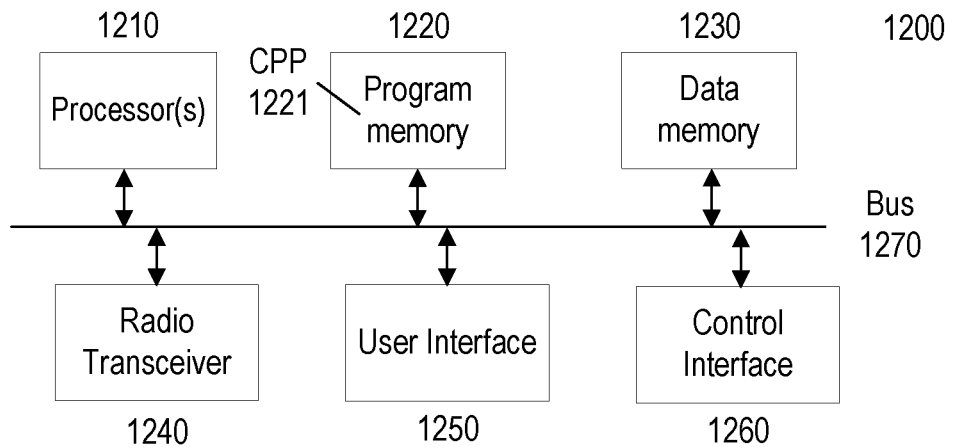
FIG. 12 shows a block diagram of an exemplary wireless device or UE, according to various embodiments of the present disclosure.

FIG. 12 shows a block diagram of an exemplary wireless device or user equipment (UE) 1200 (hereinafter referred to as "UE 1200") according to various embodiments of the present disclosure, including those described above with reference to other figures. For example, UE 1200 can be configured by execution of instructions, stored on a computer-readable medium, to perform operations corresponding to one or more of the exemplary methods described herein.

UE 1200 can include a processor 1210 (also referred to as "processing circuitry") that can be operably connected to a program memory 1220 and/or a data memory 1230 via a bus 1270 that can comprise parallel address and data buses, serial ports, or other methods and/or structures known to those of ordinary skill in the art. Program memory 1220 can store software code, programs, and/or instructions (collectively shown as computer program product (CPP) 1221 in FIG. 12) that, when executed by processor 1210, can configure and/or facilitate UE 1200 to perform various operations, including operations corresponding to various exemplary methods described herein. As part of or in addition to such operations, execution of such instructions can configure and/or facilitate UE 1200 to communicate using one or more wired or wireless communication protocols, including one or more wireless communication protocols standardized by 3GPP, 3GPP2, or IEEE, such as those commonly known as 5G/NR, LTE, LTE-A, UMTS, HSPA, GSM, GPRS, EDGE, 1×RTT, CDMA2000, 802.11 WiFi, HDMI, USB, Firewire, etc., or any other current or future protocols that can be utilized in conjunction with radio transceiver 1240, user interface 1250, and/or control interface 1260.

As another example, processor 1210 can execute program code stored in program memory 1220 that corresponds to MAC, RLC, PDCP, SDAP, RRC, and NAS layer protocols standardized by 3GPP (e.g., for NR and/or LTE). As a further example, processor 1210 can execute program code stored in program memory 1220 that, together with radio transceiver 1240, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA). As another example, processor 1210 can execute program code stored in program memory 1220 that, together with radio transceiver 1240, implements device-to-device (D2D) communications with other compatible devices and/or UEs.

Program memory 1220 can also include software code executed by processor 1210 to control the functions of UE 1200, including configuring and controlling various components such as radio transceiver 1240, user interface 1250, and/or control interface 1260. Program memory 1220 can also comprise one or more application programs and/or modules comprising computer-executable instructions embodying any of the exemplary methods described herein. Such software code can be specified or written using any known or future developed programming language, such as e.g., Java, C++, C, Objective C, HTML, XHTML, machine code, and Assembler, as long as the desired functionality, e.g., as defined by the implemented method steps, is preserved. In addition, or as an alternative, program memory 1220 can comprise an external storage arrangement (not shown) remote from UE 1200, from which the instructions can be downloaded into program memory 1220 located within or removably coupled to UE 1200, so as to enable execution of such instructions.

Data memory 1230 can include memory area for processor 1210 to store variables used in protocols, configuration, control, and other functions of UE 1200, including operations corresponding to, or comprising, any of the exemplary methods described herein. Moreover, program memory 1220 and/or data memory 1230 can include non-volatile memory (e.g., flash memory), volatile memory (e.g., static or dynamic RAM), or a combination thereof. Furthermore, data memory 1230 can comprise a memory slot by which removable memory cards in one or more formats (e.g., SD Card, Memory Stick, Compact Flash, etc.) can be inserted and removed.

Persons of ordinary skill will recognize that processor 1210 can include multiple individual processors (including, e.g., multi-core processors), each of which implements a portion of the functionality described above. In such cases, multiple individual processors can be commonly connected to program memory 1220 and data memory 1230 or individually connected to multiple individual program memories and or data memories. More generally, persons of ordinary skill in the art will recognize that various protocols and other functions of UE 1200 can be implemented in many different computer arrangements comprising different combinations of hardware and software including, but not limited to, application processors, signal processors, general-purpose processors, multi-core processors, ASICs, fixed and/or programmable digital circuitry, analog baseband circuitry, radio-frequency circuitry, software, firmware, and middleware.

Radio transceiver 1240 can include radio-frequency transmitter and/or receiver functionality that facilitates the UE 1200 to communicate with other equipment supporting like wireless communication standards and/or protocols. In some exemplary embodiments, the radio transceiver 1240 includes one or more transmitters and one or more receivers that enable UE 1200 to communicate according to various protocols and/or methods proposed for standardization by 3GPP and/or other standards bodies. For example, such functionality can operate cooperatively with processor 1210 to implement a PHY layer based on OFDM, OFDMA, and/or SC-FDMA technologies, such as described herein with respect to other figures.

In some exemplary embodiments, radio transceiver 1240 includes one or more transmitters and one or more receivers that can facilitate the UE 1200 to communicate with various LTE, LTE-Advanced (LTE-A), and/or NR networks according to standards promulgated by 3GPP. In some exemplary embodiments of the present disclosure, the radio transceiver 1240 includes circuitry, firmware, etc. necessary for the UE 1200 to communicate with various NR, NR-U, LTE, LTE-A, LTE-LAA, UMTS, and/or GSM/EDGE networks, also according to 3GPP standards. In some embodiments, radio transceiver 1240 can include circuitry supporting D2D communications between UE 1200 and other compatible devices.

In some embodiments, radio transceiver 1240 includes circuitry, firmware, etc. necessary for the UE 1200 to communicate with various CDMA2000 networks, according to 3GPP2 standards. In some embodiments, the radio transceiver 1240 can be capable of communicating using radio technologies that operate in unlicensed frequency bands, such as IEEE 802.11 WiFi that operates using frequencies in the regions of 2.4, 5.6, and/or 60 GHz. In some embodiments, radio transceiver 1240 can include a transceiver that is capable of wired communication, such as by using IEEE 802.3 Ethernet technology. The functionality particular to each of these embodiments can be coupled with and/or controlled by other circuitry in the UE 1200, such as the processor 1210 executing program code stored in program memory 1220 in conjunction with, and/or supported by, data memory 1230.

User interface 1250 can take various forms depending on the particular embodiment of UE 1200, or can be absent from UE 1200 entirely. In some embodiments, user interface 1250 can comprise a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 1200 can comprise a tablet computing device including a larger touchscreen display. In such embodiments, one or more of the mechanical features of the user interface 1250 can be replaced by comparable or functionally equivalent virtual user interface features (e.g., virtual keypad, virtual buttons, etc.) implemented using the touchscreen display, as familiar to persons of ordinary skill in the art. In other embodiments, the UE 1200 can be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many exemplary embodiments of the UE 1200 having a touch screen display are capable of receiving user inputs, such as inputs related to exemplary methods described herein or otherwise known to persons of ordinary skill.

In some embodiments, UE 1200 can include an orientation sensor, which can be used in various ways by features and functions of UE 1200. For example, the UE 1200 can use outputs of the orientation sensor to determine when a user has changed the physical orientation of the UE 1200's touch screen display. An indication signal from the orientation sensor can be available to any application program executing on the UE 1200, such that an application program can change the orientation of a screen display (e.g., from portrait to landscape) automatically when the indication signal indicates an approximate 90-degree change in physical orientation of the device. In this exemplary manner, the application program can maintain the screen display in a manner that is readable by the user, regardless of the physical orientation of the device. In addition, the output of the orientation sensor can be used in conjunction with various exemplary embodiments of the present disclosure.

A control interface 1260 of the UE 1200 can take various forms depending on the particular exemplary embodiment of UE 1200 and of the particular interface requirements of other devices that the UE 1200 is intended to communicate with and/or control. For example, the control interface 1260 can comprise an RS-232 interface, a USB interface, an HDMI interface, a Bluetooth interface, an IEEE ("Firewire") interface, an I2C interface, a PCMCIA interface, or the like. In some exemplary embodiments of the present disclosure, control interface 1260 can comprise an IEEE 802.3 Ethernet interface such as described above. In some exemplary embodiments of the present disclosure, the control interface 1260 can comprise analog interface circuitry including, for example, one or more digital-to-analog converters (DACs) and/or analog-to-digital converters (ADCs).

Persons of ordinary skill in the art can recognize the above list of features, interfaces, and radio-frequency communication standards is merely exemplary, and not limiting to the scope of the present disclosure. In other words, the UE 1200 can comprise more functionality than is shown in FIG. 12 including, for example, a video and/or still-image camera, microphone, media player and/or recorder, etc. Moreover, radio transceiver 1240 can include circuitry necessary to communicate using additional radio-frequency communication standards including Bluetooth, GPS, and/or others. Moreover, the processor 1210 can execute software code stored in the program memory 1220 to control such additional functionality. For example, directional velocity and/or position estimates output from a GPS receiver can be available to any application program executing on the UE 1200, including any program code corresponding to and/or embodying any exemplary embodiments (e.g., of methods) described herein.

Figure 13:
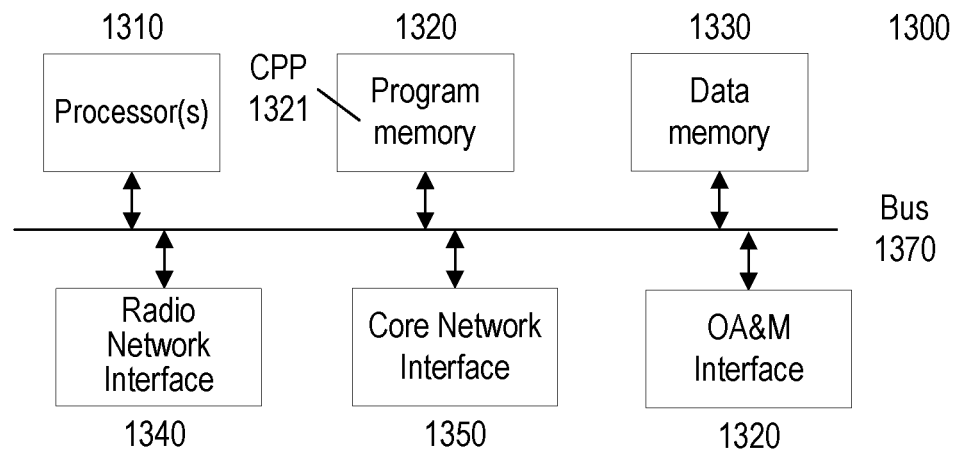
FIG. 13 shows a block diagram of an exemplary network node according to various embodiments of the present disclosure.

FIG. 13 shows a block diagram of an exemplary network node 1300 according to various embodiments of the present disclosure, including those described above with reference to other figures. For example, exemplary network node 1300 can be configured by execution of instructions, stored on a computer-readable medium, to perform operations corresponding to one or more of the exemplary methods described herein. In some exemplary embodiments, network node 1300 can comprise a base station, eNB, gNB, or one or more components thereof. For example, network node 1300 can be configured as a central unit (CU) and one or more distributed units (DUs) according to NR gNB architectures specified by 3GPP. More generally, the functionally of network node 1300 can be distributed across various physical devices and/or functional units, modules, etc.

Network node 1300 can include processor 1310 (also referred to as "processing circuitry") that is operably connected to program memory 1320 and data memory 1330 via bus 1370, which can include parallel address and data buses, serial ports, or other methods and/or structures known to those of ordinary skill in the art.

Program memory 1320 can store software code, programs, and/or instructions (collectively shown as computer program product (CPP) 1321 in FIG. 13) that, when executed by processor 1310, can configure and/or facilitate network node 1300 to perform various operations, including operations corresponding to various exemplary methods described herein. As part of and/or in addition to such operations, program memory 1320 can also include software code executed by processor 1310 that can configure and/or facilitate network node 1300 to communicate with one or more other UEs or network nodes using other protocols or protocol layers, such as one or more of the PHY, MAC, RLC, PDCP, SDAP, RRC, and NAS layer protocols standardized by 3GPP for LTE, LTE-A, and/or NR, or any other higher-layer protocols utilized in conjunction with radio network interface 1340 and/or core network interface 1350. By way of example, core network interface 1350 can comprise the S1 or NG interface and radio network interface 1340 can comprise the Uu interface, as standardized by 3GPP. Program memory 1320 can also comprise software code executed by processor 1310 to control the functions of network node 1300, including configuring and controlling various components such as radio network interface 1340 and core network interface 1350.

Data memory 1330 can comprise memory area for processor 1310 to store variables used in protocols, configuration, control, and other functions of network node 1300. As such, program memory 1320 and data memory 1330 can comprise non-volatile memory (e.g., flash memory, hard disk, etc.), volatile memory (e.g., static or dynamic RAM), network-based (e.g., "cloud") storage, or a combination thereof. Persons of ordinary skill in the art will recognize that processor 1310 can include multiple individual processors (not shown), each of which implements a portion of the functionality described above. In such case, multiple individual processors may be commonly connected to program memory 1320 and data memory 1330 or individually connected to multiple individual program memories and/or data memories. More generally, persons of ordinary skill will recognize that various protocols and other functions of network node 1300 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio network interface 1340 can comprise transmitters, receivers, signal processors, ASICs, antennas, beamforming units, and other circuitry that enables network node 1300 to communicate with other equipment such as, in some embodiments, a plurality of compatible user equipment (UE). In some embodiments, interface 1340 can also enable network node 1300 to communicate with compatible satellites of a satellite communication network. In some exemplary embodiments, radio network interface 1340 can comprise various protocols or protocol layers, such as the PHY, MAC, RLC, PDCP, and/or RRC layer protocols standardized by 3GPP for LTE, LTE-A, LTE-LAA, NR, NR-U, etc.; improvements thereto such as described herein above; or any other higher-layer protocols utilized in conjunction with radio network interface 1340. According to further exemplary embodiments of the present disclosure, the radio network interface 1340 can comprise a PHY layer based on OFDM, OFDMA, and/or SC-FDMA technologies. In some embodiments, the functionality of such a PHY layer can be provided cooperatively by radio network interface 1340 and processor 1310 (including program code in memory 1320).

Core network interface 1350 can comprise transmitters, receivers, and other circuitry that enables network node 1300 to communicate with other equipment in a core network such as, in some embodiments, circuit-switched (CS) and/or packet-switched Core (PS) networks. In some embodiments, core network interface 1350 can comprise the S1 interface standardized by 3GPP. In some embodiments, core network interface 1350 can comprise the NG interface standardized by 3GPP. In some exemplary embodiments, core network interface 1350 can comprise one or more interfaces to one or more AMFs, SMFs, SGWs, MMEs, SGSNs, GGSNs, and other physical devices that comprise functionality found in GERAN, UTRAN, EPC, 5GC, and CDMA2000 core networks that are known to persons of ordinary skill in the art. In some embodiments, these one or more interfaces may be multiplexed together on a single physical interface. In some embodiments, lower layers of core network interface 1350 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

In some embodiments, network node 1300 can include hardware and/or software that configures and/or facilitates network node 1300 to communicate with other network nodes in a RAN, such as with other eNBs, gNBs, ng-eNBs, en-gNBs, IAB nodes, etc. Such hardware and/or software can be part of radio network interface 1340 and/or core network interface 1350, or it can be a separate functional unit (not shown). For example, such hardware and/or software can configure and/or facilitate network node 1300 to communicate with other RAN nodes via the X2 or Xn interfaces, as standardized by 3GPP.

OA&M interface 1360 can comprise transmitters, receivers, and other circuitry that enables network node 1300 to communicate with external networks, computers, databases, and the like for purposes of operations, administration, and maintenance of network node 1300 or other network equipment operably connected thereto. Lower layers of OA&M interface 1360 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art. Moreover, in some embodiments, one or more of radio network interface 1340, core network interface 1350, and OA&M interface 1360 may be multiplexed together on a single physical interface, such as the examples listed above.

Figure 14:
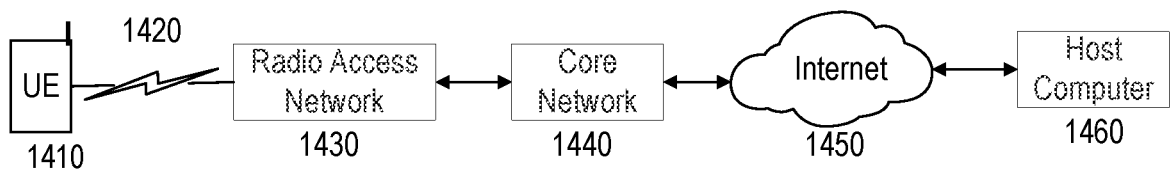
FIG. 14 shows a block diagram of an exemplary network configured to provide over-the-top (OTT) data services between a host computer and a UE, according to various embodiments of the present disclosure.

FIG. 14 is a block diagram of an exemplary communication network configured to provide over-the-top (OTT) data services between a host computer and a user equipment (UE), according to one or more exemplary embodiments of the present disclosure. UE 1410 can communicate with radio access network (RAN) 1430 over radio interface 1420, which can be based on protocols described above including, e.g., LTE, LTE-A, and 5G/NR. For example, UE 1410 can be configured and/or arranged as shown in other figures discussed above.

RAN 1430 can include one or more network nodes (e.g., base stations, eNBs, gNBs, controllers, etc.) operable in licensed spectrum bands, as well one or more network nodes operable in unlicensed spectrum (using, e.g., LAA or NR-U technology), such as a 2.4-GHz band and/or a 5-GHz band. In such cases, the network nodes comprising RAN 1430 can cooperatively operate using licensed and unlicensed spectrum. In some embodiments, RAN 1430 can include, or be capable of communication with, one or more satellites comprising a satellite access network.

RAN 1430 can further communicate with core network 1440 according to various protocols and interfaces described above. For example, one or more apparatus (e.g., base stations, eNBs, gNBs, etc.) comprising RAN 1430 can communicate to core network 1440 via core network interface 1450 described above. In some exemplary embodiments, RAN 1430 and core network 1440 can be configured and/or arranged as shown in other figures discussed above. For example, eNBs comprising an evolved UTRAN (E-UTRAN) 1430 can communicate with an evolved packet core (EPC) network 1440 via an S1 interface. As another example, gNBs and ng-eNBs comprising an NG-RAN 1430 can communicate with a 5GC network 1430 via an NG interface.

Core network 1440 can further communicate with an external packet data network, illustrated in FIG. 14 as Internet 1450, according to various protocols and interfaces known to persons of ordinary skill in the art. Many other devices and/or networks can also connect to and communicate via Internet 1450, such as exemplary host computer 1460. In some exemplary embodiments, host computer 1460 can communicate with UE 1410 using Internet 1450, core network 1440, and RAN 1430 as intermediaries. Host computer 1460 can be a server (e.g., an application server) under ownership and/or control of a service provider. Host computer 1460 can be operated by the OTT service provider or by another entity on the service provider's behalf.

For example, host computer 1460 can provide an over-the-top (OTT) packet data service to UE 1410 using facilities of core network 1440 and RAN 1430, which can be unaware of the routing of an outgoing/incoming communication to/from host computer 1460. Similarly, host computer 1460 can be unaware of routing of a transmission from the host computer to the UE, e.g., the routing of the transmission through RAN 1430. Various OTT services can be provided using the exemplary configuration shown in FIG. 14 including, e.g., streaming (unidirectional) audio and/or video from host computer to UE, interactive (bidirectional) audio and/or video between host computer and UE, interactive messaging or social communication, interactive virtual or augmented reality, cloud gaming, etc.

The exemplary network shown in FIG. 14 can also include measurement procedures and/or sensors that monitor network performance metrics including data rate, latency and other factors that are improved by exemplary embodiments disclosed herein. The exemplary network can also include functionality for reconfiguring the link between the endpoints (e.g., host computer and UE) in response to variations in the measurement results. Such procedures and functionalities are known and practiced; if the network hides or abstracts the radio interface from the OTT service provider, measurements can be facilitated by proprietary signaling between the UE and the host computer.

The exemplary embodiments described herein provide flexible and efficient techniques for UE reporting of UL TX DC locations such that signaling complexity and/or overhead is minimized and/or reduced while providing sufficient flexibility for UEs to place TX DC locations according to their particular implementations. Such techniques can facilitate increased use of intra-band CA with active BWPs on each of a plurality of CCs, which can result in increased UL data rate without excessive UE energy consumption.

When used in NR UEs (e.g., UE 1410) and gNBs (e.g., gNBs comprising RAN 1430), these improvements can increase the use of OTT data services by providing better UL performance to OTT service providers and end users (e.g., for streaming/uploading videos, etc.). Consequently, this increases the benefits and/or value of such data services to end users and OTT service providers.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification and drawings, can be used synonymously in certain instances (e.g., "data" and "information"). It should be understood, that although these terms (and/or other terms that can be synonymous to one another) can be used synonymously herein, there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

Embodiments of the techniques and apparatus described herein also include, but are not limited to, the following enumerated examples:

A1. A method for a user equipment (UE) to transmit uplink (UL) data to a network node using carrier aggregation (CA) in a wireless network, the method comprising:
receiving, from the network node, an UL configuration including:
a plurality of component carriers (CCs) within a frequency band, and
a plurality of UL bandwidth parts (BWPs) associated with each of the CCs;
determining active UL BWPs, from the configured UL BWPs, associated with at least two of the CCs;
determining at least one UL transmit direct current (TX DC) location for the active UL BWPs; and
selectively sending, to the network node, an indication of the at least one UL TX DC location.

A2. The method of embodiment A1, further comprising receiving, from the network node, a request for a UE TX DC location for the UE's active BWPs, wherein the indication is sent in response to the request.

A3. The method of embodiment A1, wherein determining the at least one UL DC TX location comprises determining a plurality of UL TX DC locations.

A4. The method of embodiment A3, wherein:
the request indicates a particular one of the plurality of UL TX DC locations; and
selectively sending comprises sending an indication of only the requested UL TX DC location.

A5. The method of embodiment A3, wherein selectively sending comprises:
identifying one of more of the plurality of UL TX DC locations that are different than corresponding one or more most recent UL TX DC locations; and
sending an indication of only the one or more UL TX DC locations that are different.

A6. The method of any of embodiments A1-A5, wherein selectively sending comprises refraining from sending the indication based on determining one of the following:

the UE sent the at least one UL TX DC location to the network node within a previous duration; or
the at least one UL TX DC location is the same as a most recent UL TX DC location.

A7. The method of any of embodiments A1-A6, wherein:
determining the active UL BWPs comprises receiving, from the network node, a BWP switching command indicating the active UL BWPs; and
the indication is sent in response to the BWP switching command.

A8. The method of any of embodiments A1-A7, wherein:
determining the active UL BWPs comprises selecting a default configured UL BWP as an active UL BWP for a particular one of the CCs after expiration of a timer associated with the particular CC; and
selectively sending comprises refraining from sending the at least one UL TX DC location determined based on the default configured UL BWP.

A9. The method of any of embodiments A1-A8, wherein the at least one UL TX DC location include:
a first UL TX DC location associated with a master cell group (MCG); and
a second UL TX DC location associated with a secondary cell group (SCG).

A10. The method of embodiment A9, wherein:
the indication of the first UL TX DC location is sent in a first message on a first signaling radio bearer (SRB), and
the indication of the second UL TX DC location is sent in a second message on a second SRB.

A11. The method of any of embodiments A1-A10, wherein for each of the at least one UL TX DC locations, the indication comprises:
a sub-carrier index associated with a particular active BWP; and
an absolute frequency corresponding to a lowest frequency of the frequency band.

A12. The method of any of embodiments A1-A10, wherein for each of the at least one UL TX DC locations, the indication comprises:
a sub-carrier index associated with a particular active BWP; and
a first absolute frequency corresponding to a lowest frequency of an active BWP that is lowest in the frequency band; and
a second absolute frequency corresponding to a highest frequency of an active BWP that is highest in the frequency band.

A13. The method of any of embodiments A11-A12, wherein for each of the at least one UL TX DC locations, the indication further comprises a sub-carrier spacing associated with the particular active BWP.

A14. The method of any of embodiments A1-A13, further comprising transmitting, to the network node via the active BWPs, data arranged in at least one OFDM symbol having the respective at least one UL TX DC location.

B1. A method, for a network node in a wireless network, to receive uplink (UL) data from a user equipment (UE) based on carrier aggregation (CA), the method comprising:
sending, to the UE, an UL configuration including:
a plurality of component carriers (CCs) within a frequency band, and
a plurality of UL bandwidth parts (BWPs) associated with each of the CCs; and receiving, from the UE, an indication of at least one UL transmit direct current (TX DC) location for the UE's active UL BWPs associated with at least two of the CCs.

B2. The method of embodiment B1, further comprising sending, to the UE, a request for a UE TX DC location for the UE's active BWPs, wherein the indication is received in response to the request.

B3. The method of embodiment B2, wherein:
the at least one UL DC TX location comprises a plurality of UL TX DC locations;
the request indicates a particular one of the plurality of UL TX DC locations; and
the indication indicates only the requested UL TX DC location.

B4. The method of any of embodiments B1-B2, further comprising:
determining that the UE's active UL BWPs are identical to a previous combination of active UL BWPs for which at least one TX DC location was received from the UE and stored by the network node;
refraining from requesting the UE TX DC location and retrieving the stored at least one TX DC location.

B5. The method of embodiment B1, wherein:
the at least one UL DC TX location comprises a plurality of UL TX DC locations; and
the indication indicates only one or more UL TX DC locations that are different than corresponding one or more most recent UL TX DC locations for the UE.

B6. The method of any of embodiments B1-B5, wherein one of the following applies:
the network node did not receive the at least one UL TX DC location from the UE within a previous duration; or
the at least one UL TX DC location is not the same as a most recent UL TX DC location received from the UE.

B7. The method of any of embodiments B1-B6, further comprising sending, to the UE, a BWP switching command indicating the active UL BWPs, wherein the indication is received in response to the BWP switching command.

B8. The method of embodiment B7, further comprising determining that the UE has selected a default configured UL BWP as an active UL BWP for a particular one of the CCs, wherein the BWP switching command is sent in response to determining that the UE has selected the default configured BWP.

B9. The method of any of embodiments B1-B8, wherein the at least one UL TX DC locations include:
a first UL TX DC location associated with a master cell group (MCG); and
a second UL TX DC location associated with a secondary cell group (SCG).

B10. The method of embodiment B9, wherein:
the indication of the first UL TX DC location is received in a first message on a first signaling radio bearer (SRB), and
the indication of the second UL TX DC location is received in a second message on a second SRB.

B11 The method of any of embodiments B1-B10, wherein for each of the at least one UL TX DC locations, the indication comprises:
a sub-carrier index associated with a particular active BWP; and
an absolute frequency corresponding to a lowest frequency of the frequency band.

B12. The method of any of embodiments B1-B10, wherein for each of the at least one UL TX DC locations, the indication comprises:
a sub-carrier index associated with a particular active BWP; and
a first absolute frequency corresponding to a lowest frequency of an active BWP that is lowest in the frequency band; and
a second absolute frequency corresponding to a highest frequency of an active BWP that is highest in the frequency band.

B12. The method of any of embodiments B11-B12, wherein for each of the at least one UL TX DC locations, the indication further comprises a sub-carrier spacing associated with the particular active BWP.

B13. The method of any of embodiments B1-B12, further comprising receiving, from the UE via the active BWPs, data arranged in at least one OFDM symbol having the respective at least one UL TX DC location.

C1. A user equipment (UE) configured to transmit uplink (UL) data to a network node using carrier aggregation (CA) in a wireless network, the UE comprising:
radio transceiver circuitry configured to communicate with a network node, in a wireless network, that has a compatible protocol stack; and
processing circuitry operatively coupled to the radio transceiver circuitry, whereby the processing circuitry and the radio transceiver circuitry are configured to perform operations corresponding to any of the methods of embodiments A1-A14.

C2. A user equipment (UE) configured to transmit uplink (UL) data to a network node using carrier aggregation (CA) in a wireless network, the UE being further arranged to perform operations corresponding to any of the methods of embodiments A1-A14.

C3. A non-transitory, computer-readable medium storing computer-executable instructions that, when executed by processing circuitry of a user equipment (UE) configured to transmit uplink (UL) data to a network node using carrier aggregation (CA) in a wireless network, configure the UE to perform operations corresponding to any of the methods of embodiments A1-A14.

C4. A computer program product comprising computer-executable instructions that, when executed by processing circuitry of a user equipment (UE) configured to transmit uplink (UL) data to a network node using carrier aggregation (CA) in a wireless network, configure the UE to perform operations corresponding to any of the methods of embodiments A1-A14.

D1. A network node, of a wireless network, configured to receive uplink (UL) data from a user equipment (UE) based on carrier aggregation (CA), the network node comprising:
radio network interface circuitry configured to communicate with the UE; and
processing circuitry operatively coupled to the radio network interface circuitry, whereby the processing circuitry and the radio network interface circuitry are configured to perform operations corresponding to any of the methods of embodiments B1-B13.

D2. A network node, of a wireless network, configured to receive uplink (UL) data from a user equipment (UE) based on carrier aggregation (CA), the network node being further arranged to perform operations corresponding to any of the methods of embodiments B1-B13.

D3. A non-transitory, computer-readable medium storing computer-executable instructions that, when executed by processing circuitry of a network node configured to receive uplink (UL) data from a user equipment (UE) based on carrier aggregation (CA), configure the network node to perform operations corresponding to any of the methods of embodiments B1-B13.

D4. A computer program product comprising computer-executable instructions that, when executed by processing circuitry of a network node configured to receive uplink (UL) data from a user equipment (UE) based on carrier aggregation (CA), configure the network node to perform operations corresponding to any of the methods of embodiments B1-B13.

The invention claimed is:

1. A method for a user equipment (UE) configured to transmit uplink (UL) data in a wireless network based on carrier aggregation (CA), the method comprising:
   determining active UL bandwidth parts (BWPs) associated with at least two component carriers (CCs) within a frequency band;
   determining at least one UL transmit direct current (TX DC) location for the active UL BWPs;
   receiving from the wireless network a request for UL TX DC locations for the UE's active UL BWPs, wherein the request indicates one or more particular requested UL TX DC locations; and
   selectively sending, to the wireless network, an indication of the determined at least one UL TX DC location, wherein in response to the request, the indication only indicates the determined at least one UL TX DC location that correspond to the one or more particular requested UL TX DC locations.

2. The method of claim 1, further comprising receiving, from the wireless network, an UL configuration including indications of the following:
   a plurality of CCs within the frequency band, including the at least two CCs; and
   a plurality of UL BWPs associated with each of the CCs, including the active UL BWPs.

3. The method of claim 2, wherein:
   determining the active UL BWPs comprises, after expiration of a timer associated with a particular one of the plurality of CCs, selecting a default one of the plurality of UL BWPs associated with the particular CC as the active UL BWP associated with the particular CC; and
   selectively sending the indication comprises refraining from sending an indication of the at least one UL TX DC location determined based on the default UL BWP.

4. The method of claim 2, wherein the request indicates the one or more particular requested UL TX DC locations based on identifying one or more of the following of interest: respective UL TX DC location indices, the frequency band, one or more of the at least two CCs, one or more of the active UL BWPs, and only UL TX DC locations that have changed.

5. The method of claim 1, wherein the at least one UL TX DC location includes:
   a first UL TX DC location associated with a master cell group (MCG) provided by a master node (MN) in the wireless network;
   a second UL TX DC location associated with a secondary cell group (SCG) provided by a secondary node (SN) in the wireless network; and
   one of the following applies:
      the indication of the first and second UL TX DC locations is sent to the MN via a first signaling radio bearer (SRB); or
      the indication of the first UL TX DC location is sent to the MN via the first SRB, and the indication of the second UL TX DC location is sent to the SN via a second SRB.

6. The method of claim 1, wherein for each of the at least one UL TX DC locations, the indication comprises:
   a sub-carrier index associated with a particular active UL BWP; and
   a first absolute frequency corresponding to a lowest frequency of the active UL BWP that is lowest in the frequency band; and
   a second absolute frequency corresponding to a highest frequency of the active UL BWP that is highest in the frequency band.

7. The method of claim 6, wherein for each of the at least one UL TX DC locations, the indication further comprises a sub-carrier spacing associated with the particular active UL BWP.

8. The method of claim 1, further comprising transmitting, to the wireless network via the active UL BWPs, data arranged in at least one OFDM symbol having the respective at least one UL TX DC location.

9. A non-transitory, computer-readable medium storing computer-executable instructions that, when executed by processing circuitry of a user equipment (UE) configured to transmit uplink (UL) data to a wireless network based on carrier aggregation (CA), configure the UE to perform operations corresponding to the method of claim 1.

10. A method for one or more network nodes of a wireless network to receive uplink (UL) data from a user equipment (UE) based on carrier aggregation (CA), the method comprising:
    sending, to the UE, an UL configuration including:
       a plurality of component carriers (CCs) within a frequency band, and
       a plurality of UL bandwidth parts (BWPs) associated with each of the CCs;
    sending to the UE a request for UL TX DC locations for the UE's active UL BWPs, wherein the request indicates one or more particular requested UL TX DC locations; and
    selectively receiving, from the UE, an indication of at least one UL transmit direct current (TX DC) location for the UE's active UL BWPs associated with at least two of the CCs, wherein in response to the request, the indication only indicates the at least one UL TX DC location that correspond to the one or more particular requested UL TX DC locations.

11. The method of claim 10, wherein selectively receiving an indication comprises receiving no indication of the at least one UL TX DC location when the at least one UL TX DC location is based on a default one of the plurality of UL BWPs associated with one of the plurality of CCs.

12. A wireless network configured to receive uplink (UL) data from a user equipment (UE) based on carrier aggregation (CA), wherein the wireless network includes one or more network nodes, wherein each network node comprises:
    radio network interface circuitry configured to communicate with the UE; and
    processing circuitry operatively coupled to the radio network interface circuitry, whereby the processing circuitry and the radio network interface circuitry are configured to perform operations corresponding to the method of claim 10.

13. A non-transitory, computer-readable medium storing computer-executable instructions that, when executed by processing circuitry of one or more network nodes of a wireless network configured to receive uplink (UL) data from a user equipment (UE) based on carrier aggregation (CA), configure the one or more network nodes to perform operations corresponding to the method of claim 10.

14. A user equipment (UE) configured to transmit uplink (UL) data to a network node in a wireless network based on carrier aggregation (CA), the UE comprising:
- radio transceiver circuitry configured to communicate with one or more network nodes in the wireless network; and
- processing circuitry operatively coupled to the radio transceiver circuitry, whereby the processing circuitry and the radio transceiver circuitry are configured to:
- determine active UL bandwidth parts (BWPs) associated with at least two component carriers (CCs) within a frequency band;
- determine at least one UL transmit direct current (TX DC) location for the active UL BWPs;
- receiving from the wireless network a request for UL TX DC locations for the UE's active UL BWPs, wherein the request indicates one or more particular requested UL TX DC locations; and
- selectively send, to the wireless network, an indication of the determined at least one UL TX DC location, wherein in response to the request, the indication only indicates the determined at least one UL TX DC location that correspond to the one or more particular requested UL TX DC locations.

15. The UE of claim 14, wherein:
the processing circuitry and the radio transceiver circuitry are further configured to receive, from the wireless network, an UL configuration including indications of the following:
- a plurality of CCs within the frequency band, including the at least two CCs; and
- a plurality of UL BWPs associated with each of the CCs, including the active UL BWPs;

the processing circuitry and the radio transceiver circuitry are configured to determine the active UL BWPs based on, after expiration of a timer associated with a particular one of the plurality of CCs, selecting a default one of the plurality of UL BWPs associated with the particular CC as the active UL BWP associated with the particular CC; and the processing circuitry and the radio transceiver circuitry are configured to selectively send the indication based on refraining from sending an indication of the at least one UL TX DC location determined based on the default UL BWP.

16. The UE of claim 14, wherein the at least one UL TX DC location includes:
- a first UL TX DC location associated with a master cell group (MCG) provided by a master node (MN) in the wireless network;
- a second UL TX DC location associated with a secondary cell group (SCG) provided by a secondary node (SN) in the wireless network; and
- one of the following applies:
  - the indication of the first and second UL TX DC locations is sent to the MN via a first signaling radio bearer (SRB); or
  - the indication of the first UL TX DC location is sent to the MN via the first SRB, and the indication of the second UL TX DC location is sent to the SN via a second SRB.

* * * * *